United States Patent [19]
Nobusawa

[11] 4,006,484
[45] Feb. 1, 1977

[54] CAMERA SYSTEMS FOR PROVIDING PRECISE EXPOSURES WITH DIGITAL LIGHT MEASUREMENT

[75] Inventor: Tsukumo Nobusawa, Tokyo, Japan

[73] Assignee: Asahi Kogaku Kogyo Kabushiki Kaisha, Japan

[22] Filed: May 27, 1975

[21] Appl. No.: 580,698

Related U.S. Application Data
[63] Continuation-in-part of Ser. No. 576,021, May 9, 1975.

[30] Foreign Application Priority Data

| | | |
|---|---|---|
| May 31, 1974 | Japan | 49-62131 |
| June 17, 1974 | Japan | 49-68869 |
| Sept. 3, 1974 | Japan | 49-100578 |
| Sept. 9, 1974 | Japan | 49-103660 |

[52] U.S. Cl. ............................... 354/23 D; 354/43; 354/50; 354/51; 354/60 A; 354/60 L
[51] Int. Cl.² .......................................... G03B 7/08
[58] Field of Search .............. 354/23 D, 29, 43, 44, 354/50, 51, 60 R, 60 A, 60 L

[56] References Cited
UNITED STATES PATENTS

| | | | |
|---|---|---|---|
| 3,765,311 | 10/1973 | Nobusawa | 354/23 D |
| 3,769,887 | 11/1973 | Nobusawa | 354/23 D |

*Primary Examiner*—Russell E. Adams, Jr.
*Attorney, Agent, or Firm*—Steinberg & Blake

[57] ABSTRACT

A camera having a digitally operating structure for determining exposure time according to a digital value corresponding to the light intensity. The camera also has an adjustable diaphragm. The latter is adjusted in accordance with the difference between the digital value used for determining the exposure time and the actual value of the light intensity where the latter does not coincide with the digital value for the exposure time, so as to increase the precision of the exposure.

18 Claims, 24 Drawing Figures

↑
Shutter
Opening

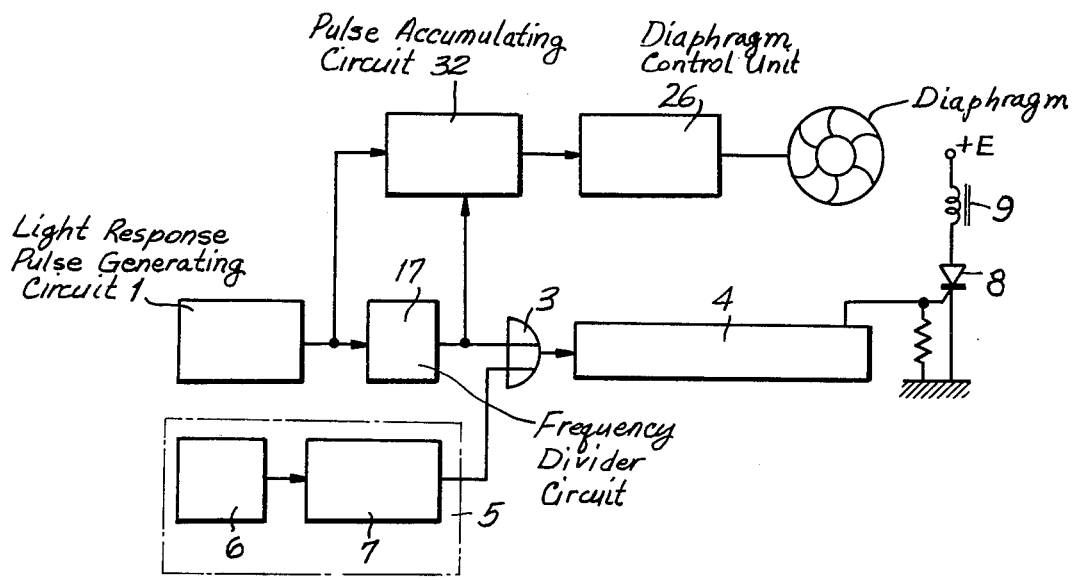
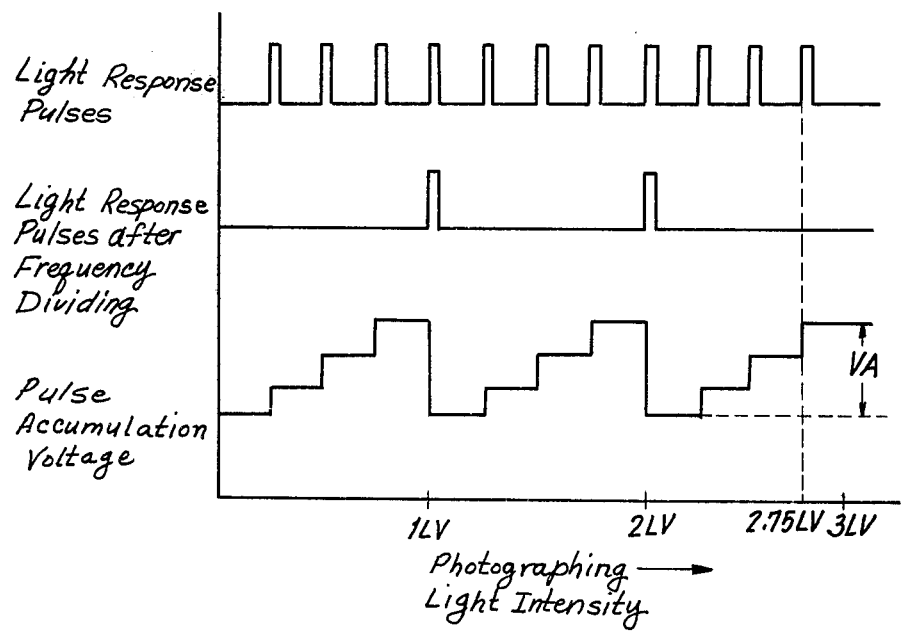

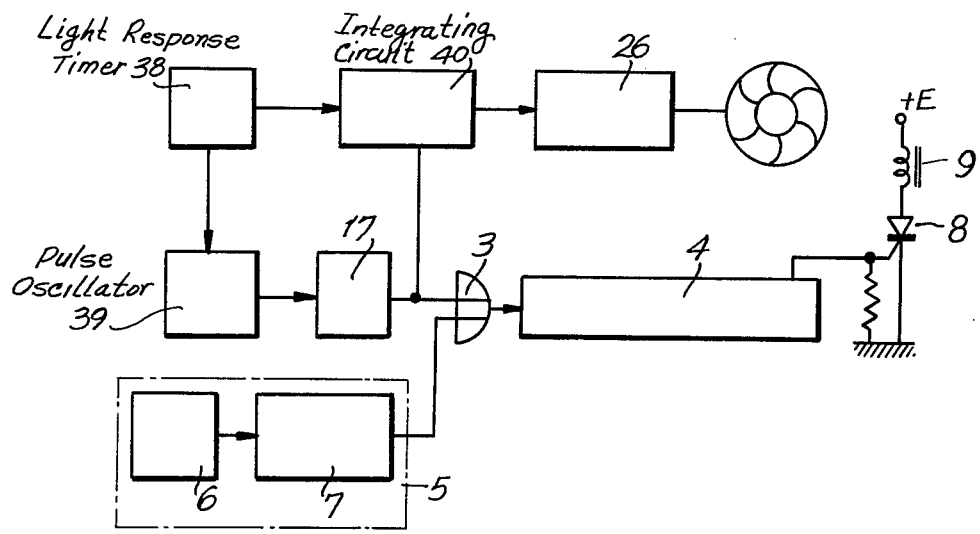
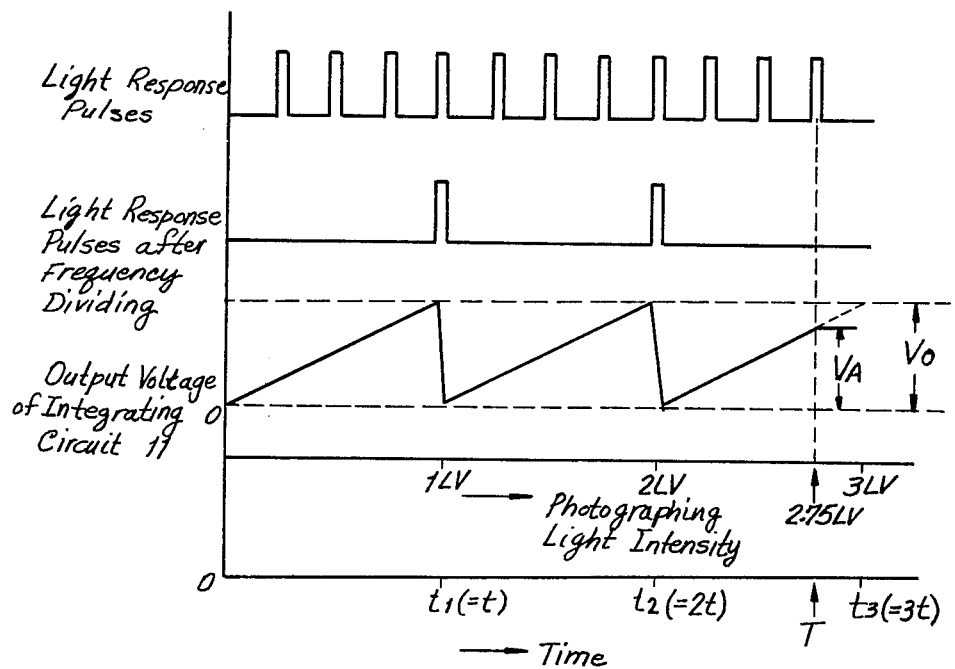

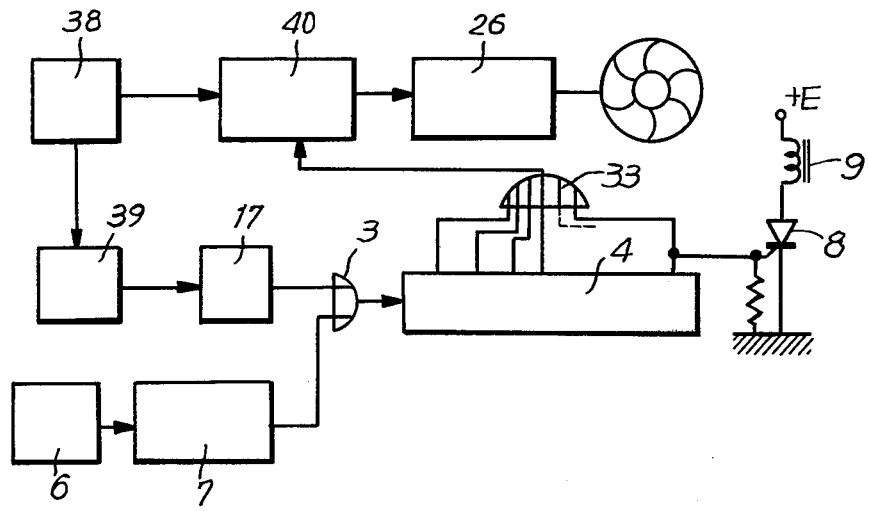
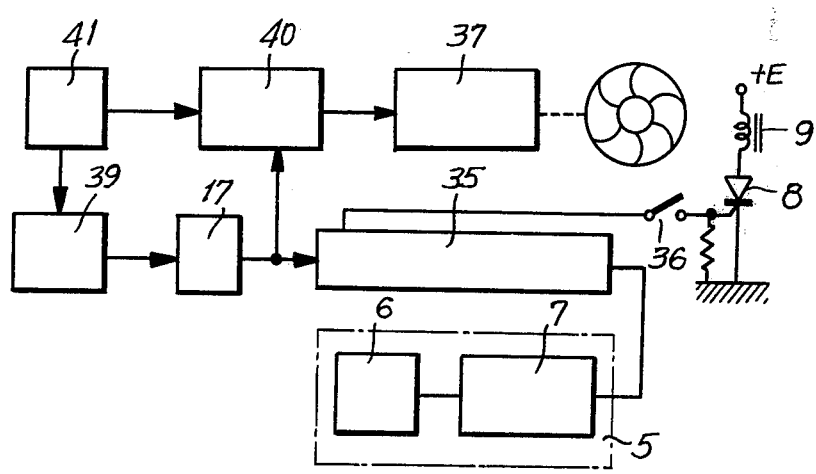

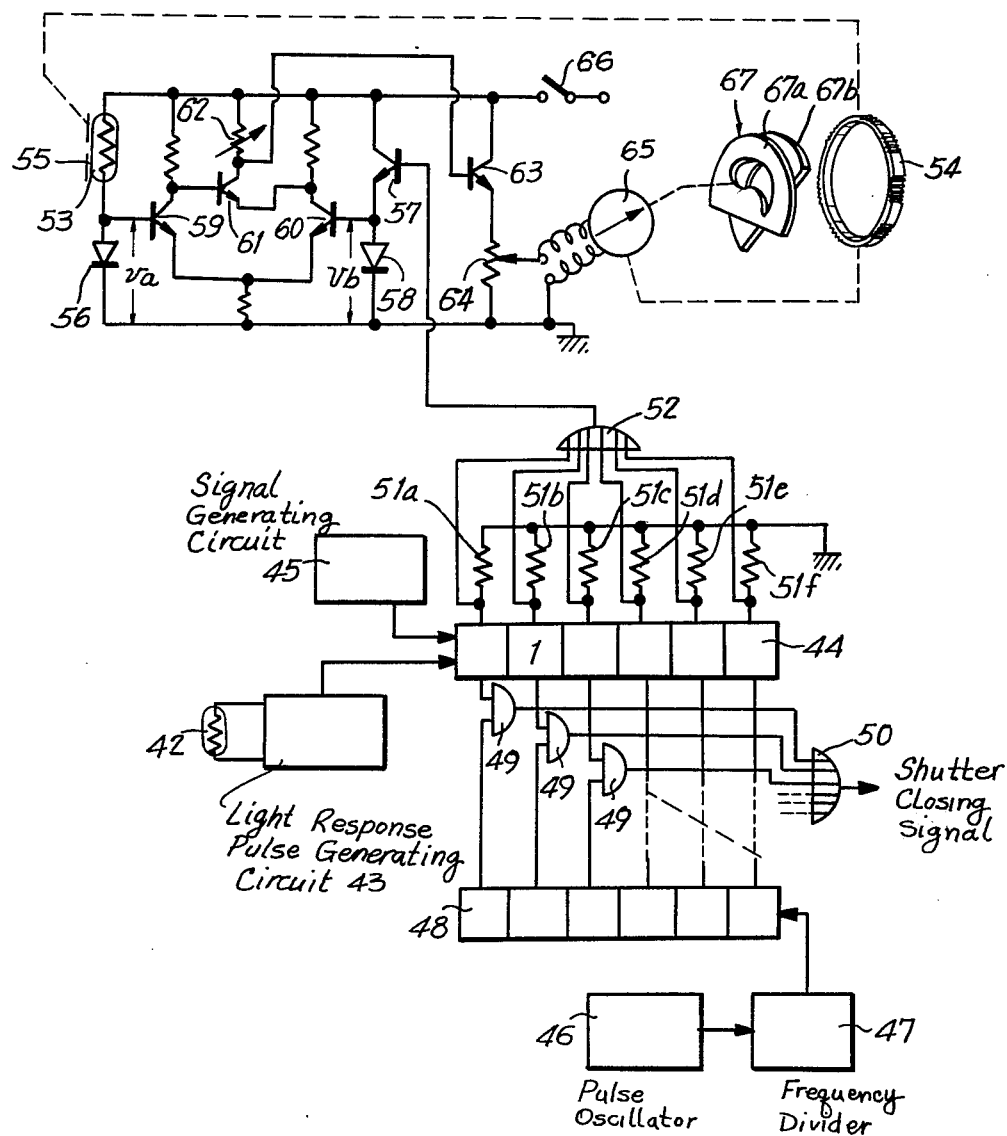

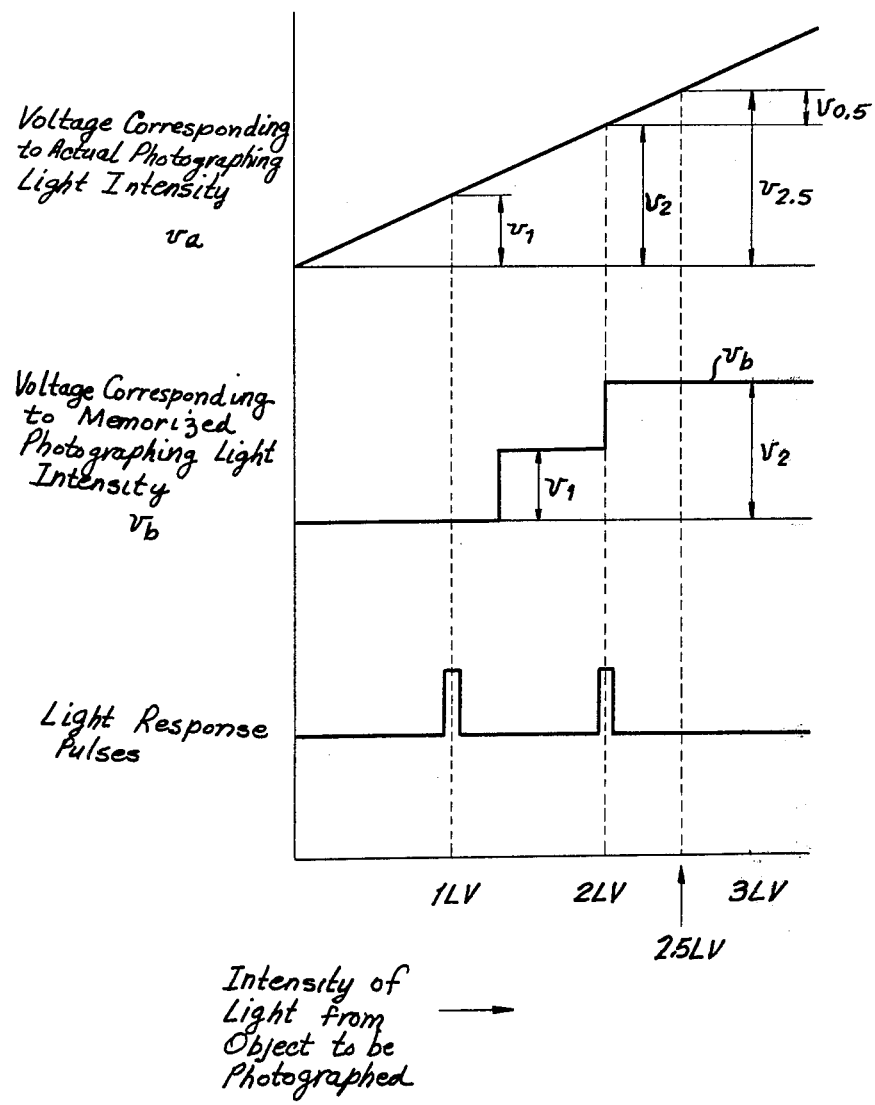

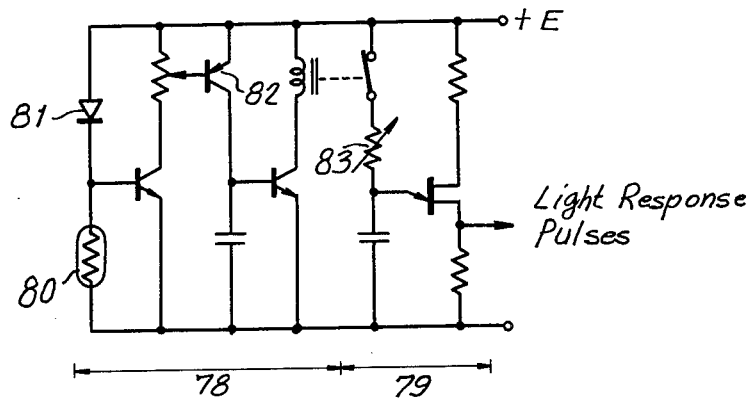
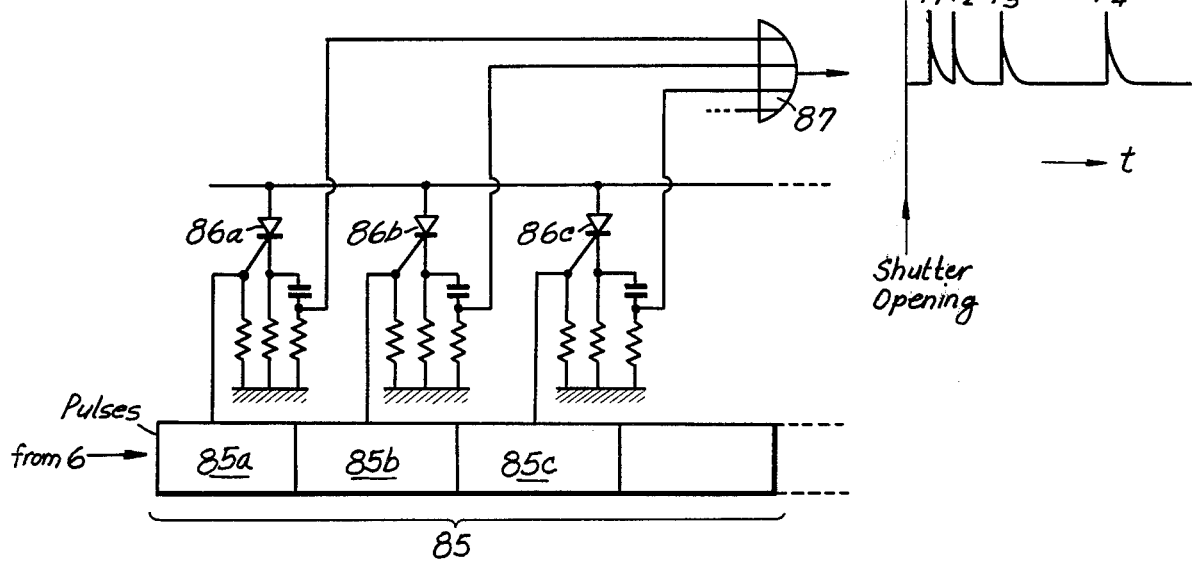
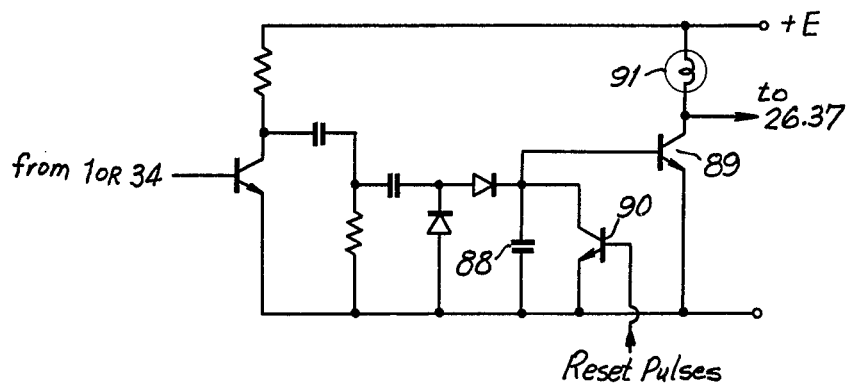

CAMERA SYSTEMS FOR PROVIDING PRECISE EXPOSURES WITH DIGITAL LIGHT MEASUREMENT

CROSS REFERENCE TO RELATED APPLICATION

This application is a continuation-in-part of copending application Ser. No. 576,021, filed May 9, 1975, and entitled AUTOMATIC SHUTTER CONTROLS FOR CAMERAS.

BACKGROUND OF THE INVENTION

The present invention relates to cameras.

In particular, the present invention relates to cameras which are capable of automatically determining exposure time by way of a digital structure which cooperates with the shutter to determine the exposure time in accordance with factors such as the light intensity.

The invention is particularly applicable to cameras having through-the-lens light-measuring systems and wherein the exposure time is capable of being set in a stepwise manner according to discrete quantities.

While exposure-time determination of this latter type is highly desirable in certain respects, it has the disadvantage of presenting certain inaccuracies where the actual light intensity does not coincide with one of the discrete quantities used for determining the exposure time. Thus, with an analog type of electric shutter where the exposure time is determined with a timing capacitor which memorizes the light intensity as a voltage value, the exposure time is determined in a nonstepwise manner. However, where the quantity corresponding to the light intensity is memorized in a digital form, the light intensity which actually is a continuously varying quantity, is capable of being memorized only as an approximate discrete quantity, so that it is not possible with such a construction to obtain a nonstepwise determination of the exposure time.

With a so-called digital type of exposure time determination where the photographing light intensity is converted into a number of pulses which is memorized by a counter circuit and the shutter time is controlled in accordance with this memorized value, if it is desired to increase the accuracy of the exposure time, it is essential to utilize a relatively high frequency of pulse oscillation and to increase the number of memory stages. However, with constructions of this latter type where discrete, quantized digital values corresponding to light intensity are memorized, it is inevitable that there will be a certain quantization error, and thus this latter unavoidable error when using digital types of memory devices will unavoidably introduce undesirable inaccuracies in the exposure time.

SUMMARY OF THE INVENTION

It is accordingly a primary object of the present invention to provide a construction which will avoid the above drawbacks.

In particular, it is an object of the present invention to provide a construction according to which it is possible to provide digital determination of an exposure-determining factor such as exposure time, utilizing a relatively small number of digital values, while at the same time being capable of achieving a degree of accuracy in the exposure which is beyond what would be expected only from these digital values.

It is in particular an object of the present invention to provide a construction of this latter type which is capable of compensating for the difference between the actual light intensity and the particular light intensity corresponding to the digital value utilized for determining a factor such as exposure time.

Yet another object of the present invention is to provide a construction of this latter type which is capable of automatically determining this compensation.

Furthermore it is an object of the present invention to provide a construction according to which it is possible for the operator to provide a manual compensating adjustment in response to an indication of the extent of compensation which is required.

It is furthermore an object of the present invention to provide a construction of the above type which is capable of achieving the desired results even though the measurement of the light is interrupted when the shutter opens to make an exposure.

Moreover it is an object of the present invention to provide a construction which is capable of determining the difference between the light intensity corresponding to the digital value used for exposure determination and the actual prevailing light intensity which is present even during exposure, so that this latter difference may be utilized for achieving an extremely precise film exposure in the camera.

According to the invention the electrically controlled shutter is provided with a digital memory means which memorizes the photographing light intensity information as a digital value while the shutter or exposure time is automatically controlled in accordance with this latter memorized value. On the other hand, the exposure aperture which has been predetermined in accordance with the setting of the diaphragm is adjusted when necessary to provide a compensation in accordance with the difference between the actual light intensity and the memorized digital value corresponding to the light intensity.

Thus, according to the invention the camera is provided with a pair of means for participating in the determination of the extent to which film in the camera is exposed. This pair of means includes one means, such as the diaphragm, which is adjustable and preliminarily set to remain normally at a given adjusted position during exposure of the film. The other of the above pair of means may be used for determining the exposure time and is automatically operable in accordance with light intensity. A light-responsive means for responding to the light intensity provides in accordance with the light intensity a quantity the magnitude of which corresponds to the light intensity. A digital memory means has a series of digital positions at least one of which is close to but does not necessarily coincide precisely with the magnitude of the quantity provided by the light-responsive means. This digital memory means is operatively connected with the light-responsive means for memorizing the magnitude of the quantity provided thereby at least approximately by way of this one digital position of the digital memory means which is close to the actual magnitude of the quantity provided by the light-responsive means. A detecting means is operatively connected with the digital memory means for detecting at least approximately the difference between the magnitude of the quantity corresponding precisely to the one digital position of the digital memory means and the actual magnitude of the quantity provided by the light-responsive means. An adjusting means is operatively connected with the adjustable means such as the diaphragm for adjusting the latter in accordance with this difference, if any, detected by the detecting means. In this way there is provided a compensating adjustment according to this difference. The digital memory means is operatively connected with the other of the above pair of means such as the means for determining the exposure time so as to operate the latter according to the one digital position which is close to the magnitude of the quantity provided by the light-responsive means. In this way in the event that this latter magnitude does not coincide precisely with this digital position of the digital memory means, the compensating adjustment will provide for the film in the camera an exposure which is more accurate than that which would have been achieved without the compensating adjustment.

BRIEF DESCRIPTION OF DRAWINGS

The invention is illustrated by way of example in the accompanying drawings which form part of this application and in which:

FIG. 7 schematically illustrates an embodiment of the invention according to which a pulse accumulating circuit is utilized in determining the compensating adjustment;

FIG. 8 is a graph of the operation of the embodiment of FIG. 7;

FIG. 11 is a schematic illustration of a further embodiment of the invention according to which a timer responds to the light intensity and operates a pulse oscillator as well as an integrating circuit which provides sawtooth waves utilized in connection with determining the compensating adjustment;

FIG. 12 is a graph illustrating the operation of the embodiment of FIG. 11;

FIG. 13 shows a variation of the embodiment of FIG. 11 according to which the integrating circuit is controlled in a manner different from that of FIG. 11;

FIG. 14 illustrates schematically a variation of the embodiment of FIG. 11 according to which a reverse shift register is used;

FIG. 15 schematically illustrates a further embodiment of the invention according to which a compensating adjustment is made in accordance with the differential between a pair of voltages one of which corresponds to the actual light intensity prevailing even during exposure of film;

FIG. 16 is a graph illustrating the manner in which the embodiment of FIG. 15 operates;

FIGS. 19–22 and 24 respectively illustrate details of various units shown in block form in the other Figures.

DESCRIPTION OF PREFERRED EMBODIMENTS

Figure 1:
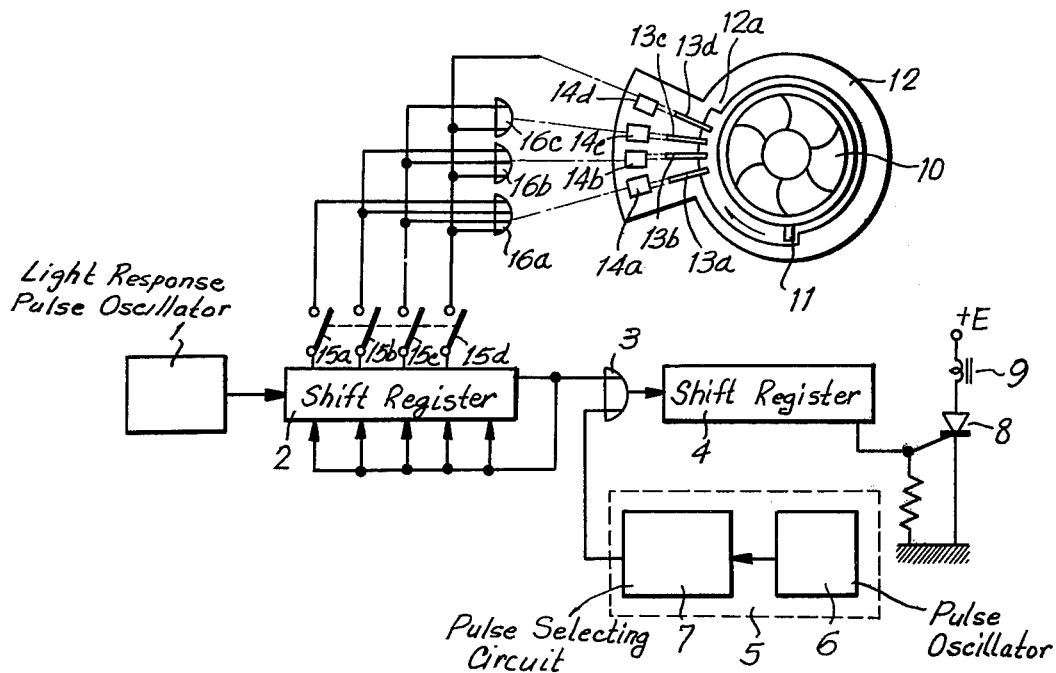
FIG. 1 is a schematic illustration of one embodiment of the invention according to which the diaphragm can receive a compensating adjustment while a digital memory means is provided for determining the exposure time.

Referring first to FIG. 1, in the embodiment of the invention which is illustrated therein there is a light-responsive means 1 for responding to the light intensity so as to provide in accordance therewith a quantity the magnitude of which corresponds to the light intensity. In the example illustrated this light-responsive means 1 is in the form of a light-responsive pulse oscillator which will produce a number of pulses in response to the light intensity, and this number of pulses will be determined in accordance with the light intensity. This light-responsive means 1 is adapted to be situated in a camera of a through-the-lens light-measuring type, such as at the viewfinder of such a camera, so that when the mirror of the camera swings up just prior to exposure of film the light will no longer reach the light-responsive means 1. Moreover, this structure of FIG. 1 is adapted to be used in a camera of the fully open light-measuring type, which is to say that during light measuring the aperture is fully open, this aperture being automatically stopped down just prior to exposure of the film in a manner well known in the art.

The light-responsive means 1 may, for example, have a construction as shown in FIG. 19. Thus, referring to FIG. 19 it will be seen that the light-responsive means 1 includes a light-responsive timer section 78 and a pulse-oscillator section 79 which utilizes a unijunction transistor to produce pulses the number of which is proportional to the logarithm of the intensity of the photographing light which is received by the photosensitive means 80 which may take the the form of a cadmium sulfide cell. This photosensitive means 80 is connected in series with a logarithmic compression diode 81, and the circuitry of FIG. 19 includes conventional elements for achieving the light-responsive pulses. Thus, the variable resistor connected to the base of transistor 82 as well as the variable resistor 83 may be utilized for introducing into the circuitry factors such as the selected diaphragm setting, the selected film speed setting, and the like. In the example shown in FIG. 19 the number of light-responsive pulses which are produced by the light-responsive means is directly proportional to the light intensity. If, however, the elements 80 and 81 are reversed with respect to their relative positions shown in FIG. 19, then the light-responsive means will provide a number of pulses inversely proportional to the light intensity. Thus, in the embodiment of FIG. 10 as well as in additional embodiments referred to below, there is a light-responsive means 34 which provides a number of pulses inversely proportional to the light intensity, and thus the means 34 of FIG. 10 will have the construction of FIG. 19 except that the relative positions of components 80 and 81 will be reversed.

Thus, referring to FIG. 1, the light-responsive means 1 will generate pulses the number of which is proportional to the logarithm of the photographing light intensity. The circuitry is such that a variation such as a doubling variation in the photographic light intensity according to light values as 1LV, 2LV, 3LV, 4LV, etc. will respectively produce pulses in numbers $e$, $e+m$, $e+2m$, $e+3m$, etc., respectively, according to an arithmetic progression. Arbitrary values may be selected for the numbers e and m. For the purposes of explanation it may be assumed, for example, that the numbers e and m are equal to each other and each correspond to 5 pulses. Therefore, each time the photographic light intensity increases by 1LV, there is an increase in the number of pulses by 5 pulses. This arrangement may be seen from the upper part of FIG. 2 where it will be seen that there are 5 pulses for each incremental increase of light value.

In the embodiment of FIG. 1 there is a digital memory means 4 in the form of a shift register having a series of digital positions respectively corresponding to the light values so that for the first 5 pulses in the illustrated example the shift register 4 will be in its first digital position corresponding to 1LV, while if there are 10 pulses in this particular example then the shift register 4 will shift to the next position representing 2LV, and so on. Thus it will be seen that in order to reduce the number of digital positions of the shift register 4, the several digital positions thereof correspond respectively to 1LV, 2LV, etc., without requiring the shift register to have a number of positions corresponding precisely to the exact number of pulses, so that in this way the construction of the shift register 4 can be greatly simplified.

In order to transmit to the digital memory means 4 a single pulse for each 5 pulses generated by the light-responsive means 1, in the illustrated example, there is connected between the light-responsive means 1 and the shift register 4, through an OR gate 3 a second shift register 2, this particular shift register being of the type which is automatically reset each time it counts up to a given number which in the illustrated example is 5. Thus, each time the shift register 2 receives a pulse from the light-responsive means 1, the output 1 state of the shift register 2 is shifted by one stage until in this particular example the number of pulses reaches 5. The fifth pulse is applied as an input to the digital memory means formed by the shift register 4, through the OR circuit 3, and at the same time the shift register 2 is automatically reset in a well known manner so as to repeat the counting of the pulses generated by the light-responsive means 1. Thus, with this arrangement the shift register 4 will count 1 pulse for every 5 pulses generated by the light-responsive means 1. It is therefore apparent that the digital memory means 4 will have a digital position corresponding to the total number of pulses provided by the light-responsive means 1 divided by a constant which in this particular example is 5, and of course there may be a remaining number of pulses, less than 5, left over after dividing the total number of pulses from the means 1 by this constant, and the manner in which these remaining pulses are treated with the invention is described below.

Figure 3:
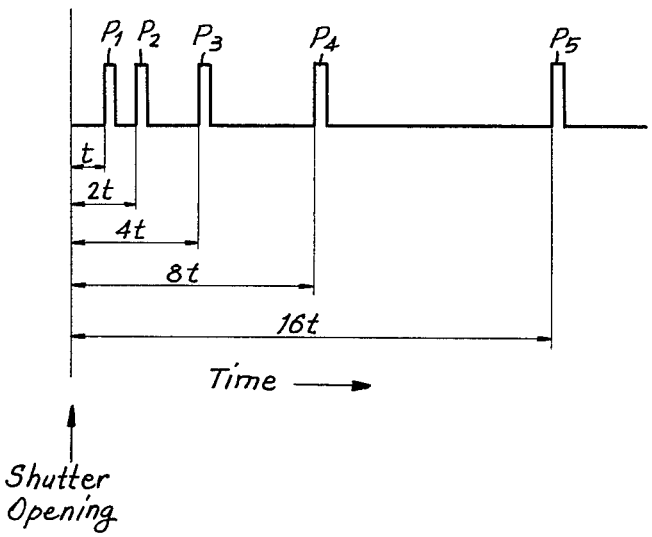
FIG. 3 is a graph illustrating reference pulses utilized during actual exposure of film.

In order to determine in an automatic manner the duration of the exposure time, a reference pulse generating means 5 is provided. With a camera which incorporates the structure of FIG. 1, during the initial part of the depression of the shutter-tripping plunger a circuit is closed to the light-responsive means 1 so that the digital memory means 4 will memorize by its particular digital position a value corresponding at least approximately to the light intensity. When the shutter-tripping plunger has been depressed sufficiently to trip the shutter in order to start exposure of the film, simultaneously with opening of the shutter the circuit which includes the reference-pulse generating means 5 is closed, and now reference pulses will be transmitted to the shift register 4 through the OR gate or circuit 3. This reference-pulse generating means 5 includes a pulse oscillator 6 for generating pulses of a constant period and a pulse-selecting means 7 in the form of a circuit which permits the $2^n$-th one of the pulses from the pulse oscillator 6 to pass. In this way the pulses transmitted to the shift register 4 from the reference pulse generating means 5 will vary according to a geometric progression having a common ratio 2. This arrangement is shown in FIG. 3. Since the pulses provided by the light-responsive means 1 are logarithmically compressed, an expansion is provided by way of this arrangement shown in FIG. 3.

The pulse selector 7 may have a construction as illustrated in FIG. 20. Thus, a binary counter 85 having bit stages 85a, 85b, 85c, etc. and SCR's 86a, 86b, 86c, etc. is provided so that the several SCR's will respectively turn on when receiving outputs from the bit stages to which they are respectively connected. Thus, while only three bit stages and SCR's are illustrated, actually a much greater number can be provided. Each SCR is provided with a differentiation circuit made up of a capacitor and a resistor so that when a particular SCR is "ON" a differentiation pulse is sent to an OR circuit 87. Thus, when with the pulse-selecting circuit 7 as shown in FIG. 20 puleses are received from the pulse oscillator 6 upon opening of the shutter, these pulses are applied as an input to the binary counter 85, and the bit stages 85, 85b, 85c produce outputs in a binary manner. The SCR's 86a, 86b, 86c respectively receive these outputs and are turned "ON" by the first, the second, the fourth, and so on, input pulses, respectively. Accordingly, the OR circuit 87 produces a procession or series of reference pulses as shown at the right in FIG. 20 and as illustrated in FIG. 3. Thus, in this procession of reference pulses, the time durations from the opening of the shutter to generation of the several pulses $P_1$, $P_2$, $P_3$, $P_4$, etc. constitutes a doubling arithmmetic progression.

This procession of reference pulses will thus be transmitted to the shift register 4 in order to cause the latter to continue to shift from one position or stage to the next position or stage until the last stage of the shift register produces an output 1. The output of this last stage is transmitted to an SCR 8 so as to turn the latter "ON," and the result is that the electromagnet 9 will become energized at this time. This electromagnet 9 in a known way serves upon being energized to release the trailing curtain of the shutter so that the energizing of the electromagnet 9 results in termination of the exposure.

As was pointed out above, in the particular example illustrated in FIG. 1 the light-responsive means 1 provides a total number of pulses which is directly proportional to the light intensity. The total number of stages or positions of the shift register 4 is such that the difference between this total number of stages and the number of positions through which the shift register 4 shifts in response to pulses received from the light-responsive means 1 will determine the exposure time. Thus, where the light intensity is relatively great, the shift register 4 will shift prior to opening of the shutter through a relatively large number of positions, so that a smaller number of positions will remain to respond to the reference pulses and thus a relatively short exposure time will be produced. On the other hand, if the light intensity is relatively low, then the shift register 4 will have been shifted prior to exposure only through a relatively small number of positions, so that a relatively large number of reference pulses will be required to shift the register 4 all the way up to its last position which will provide the output for the SCR 8, so that in this way a longer exposure time is provided for a relatively small light intensity.

The diaphragm for determining the size of the aperture through which the film is exposed includes the blades 10 schematically illustrated in FIG. 1. An adjusting ring 12 which is also schematically illustrated is provided for preselecting the aperture, and in accordance with this preselected aperture the diaphragm will be stopped down to provide the preselected aperture simultaneously with swinging up of the mirror, just prior to exposure of the film, in a well known manner. The stopping down movement of the diaphragm is accompanied by turning of a pin 11, as schematically shown in FIG. 1, in a counterclockwise direction as illustrated by the arrow in FIG. 1. Thus, the angular range of movement of the pin 11 will be determined through the preselected position of the ring 12. The details of the diaphragm structure are of course well known so that the diaphragm is capable of being automatically stopped down just prior to exposure for providing the selected aperture while at the same time the light measurement can take place through the fully open diaphragm.

Figure 4:
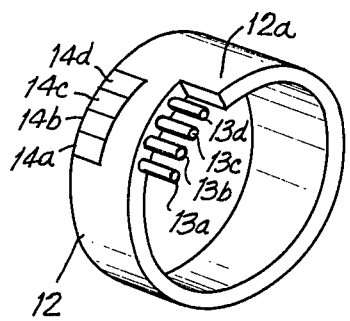
FIG. 4 is a schematic perspective illustration of the structure for providing a compensating adjustment at the diaphragm.

In the particular example illustrated in FIG. 1, however, the selecting ring 12 for selecting the aperture is modified in that it has a portion formed with bores accommodating fingers 13a, 13b, 13c, and 13d, as schematically illustrated in FIG. 1. Instead of axially movable fingers or pins it is possible to use swingable levers, depending upon the particular construction. These several fingers normally occupy positions in the path of movement of the pin 11. The fingers are held in this position by unillustrated springs respectively situated in the bores behind the fingers, and behind these springs are situated electromagnets 14a–14d, respectively, so that when a particular one of these electromagnets is energized the finger controlled thereby will be retracted in opposition to the spring acting thereon and thus maintained beyond the path of movement of the pin 11. Thus, when the electromagnet 14a is energized the finger 13a will be retracted outwardly beyond the path of movement of the pin 11, when the electromagnet 14b is energized the finger 13b will be retracted outwardly beyond the path of movement of the pin 11, and so on. In the event that all four pins 13a –13d are retracted as a result of energizing of all of the electromagnets, then the pin 11 can turn until it engages a shoulder 12a of the ring 12. The several pins or fingers 13a–13d and the shoulder 12a of the diaphragm ring 12 are arranged in such a way as to divide one scale section, or in other words one graduation of the diaphragm scale, into four equal parts. Although the structure is shown schematically in FIG. 1 with all of the several pins and electromagnets situated in a common plane normal to the optical axis, it is preferred in practice to utilize an arrangement as shown in FIG. 4 where the several pins and electromagnets are arranged respectively along axes which are parallel to the optical axis. Thus, the pins and electromagnets are respectively arranged along axes which are parallel to the axis around which the ring 12 is turned. Moreover, although FIG. 4 shows an arrangement where the several electromagnets 14a–14d are mounted on the ring 12 to rotate therewith, it is preferred to provide an arrangement according to which the electromagnets 14a–14d are carried by the body of the camera so that with such an arrangement it is not necessary to provide several interchangeable objectives each with a group of electromagnets.

Returning now to FIG. 1, it will be seen that the shift register 2 has its several positions or stages connected respectively to a plurality of switches 15a–15d. These switches are normally open. They are operatively connected with the mechanism associated with the mirror of the camera so that when the mirror swings up just prior to exposure of the film the switches 15a–15d, all of which are ganged together, are automatically displaced to a closed position. Thus the swinging up of the mirror will also result in closing of the several switches 15a–15d.

Assuming now that with these switches closed the first stage of shift register 2 provides an output 1, then this output 1 is applied through the switch 15a to the electromagnet 14a, through the OR gate or circuit 16a, so that now the electromagnet 14a will be energized and the finger 13a will be retracted. When the next pulse from the light-responsive means 1 shifts the register 2 into its second position, then the output will be transmitted through the switch 15b to the pair of electromagnets 14a and 14b through the OR gates 16a and 16b, and thus at this time both of these electromagnets will be energized so as to retract both of the fingers 13a and 13b. In a similar manner during the successive shifting of the shift register 2 in response to the pulses received from the pulse-generating means 1, the several fingers will be retracted so that when four pulses are received by the shift register 2, all four fingers 13a–13d are retracted, and of course this sequence of operation is repeated each time the shift register 2 is reset. Thus, when the last stage of shift register 2 produces an output 1, this shift register is immediately reset so that the output of each stage of the shift register now becomes 0, and thus upon resetting of the shift register all of the electromagnets 14a–14d become unenergized.

Thus, with the above-described structure of FIG. 1, initially the selecting ring 12 will be turned to select a given aperture, and of course all of the electromagnets and fingers 13a–13d will turn with the ring 12. Also, the film sensitivity value is set into the camera in a well known manner. Then the shutter-tripping plunger is depressed, and the initial increment of movement thereof causes the light-responsive means 1 to generate the pulses so that these pulses are now applied to the shift register 2. Assuming, for example, that the light intensity is such that the means 1 provides ten pulses corresponding to 2LV, then the result is that the shift register 2 has been reset twice and two pulses have been received by the digital memory means 4. As a result at this time the shift register 2 is in its reset state so that the output of all of its stages is 0, while the output of the second stage or position of the shift register 4 is 1.

Now when the switches 15a–15d are closed in response to swinging up of the mirror, none of the electromagnets 14a–14d will become excited so that the several pins 13a–13d remain in the position shown in FIG. 1 projecting into the path of turning of the pin 11. Of course the initial selected angular position of the ring 12, together with the pins 13a–13d which turn therewith, will provide a relative angular distance between the pin 11 and the first pin 13a, so that when the diaphragm is automatically stopped down just prior to exposure the pin 11 will turn through a given angle into engagement with the first pin 13a to provide the preselected aperture. In this way the diaphragm blades are stopped down to provide the proper aperture for exposure.

Immediately after stopping down of the diaphragm to the preselected aperture the shutter opens and the reference pulses are provided from the reference-pulse generating means 5 as described above, so that the shift register 4 is shifted through its successive positions until the last stage thereof causes the closing of the shutter in a manner described above.

Thus, with the above example, the actual light intensity received by the light-responsive means 1 coincides with a multiple of the number of pulses in each group provided by the shift register 2 prior to resetting thereof, so that in this case the total number of pulses divided by the constant will produce a given integer without any remainder. Thus it happens that in this particular example the shift register 4 will provide an extremely precise determination of the exposure time.

Figure 2:
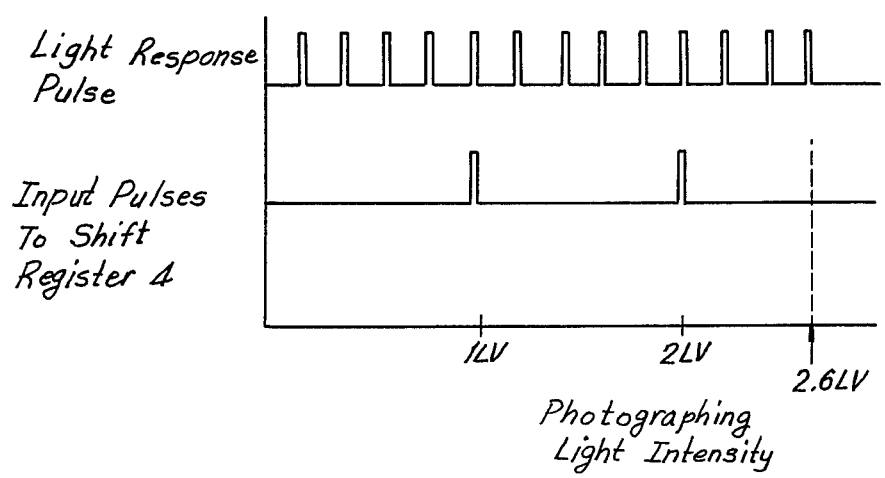
FIG. 2 is a graph illustrating the relationship between pulses corresponding to the light intensity and pulses utilized for digital memory purposes.

However, it is assumed that the actual light intensity is 2.6LV, as indicated in FIG. 2, then assuming that the selected aperture and film speed are the same as in the above example, it will be seen that 13 light-responsive pulses will be produced, and the digital memory means 4 will still have the same position as in the above example so that the exposure time will not be changed in any way. However, because the switches 15a–15d are closed upon swinging up of the mirror, when the 13th pulse is received by the shift register 2, the output will be provided through the switch 15c through the severalOR circuits 16a–16c, to cause the electromagnets 14a–14c to become energized and to retract the fingers 13a–13c.

Thus in this particular example when the diaphragm is automatically stopped down, the pin 11 instead of terminating its movement when engaging the pin 13a will instead continue to move until it engages the pin 13d. Immediately after such stopping down of the diaphragm the shutter is opened and the exposure is made with precisely the same time as in the case of a light intensity of 2LV. Thus, even though the light intensity is 2.6LV, the shift register 4 memorizes only the photographic light intensity as 2LV, so that the shutter or exposure time is determined in accordance with this latter value. If all other conditions were to remain the same, then there would be an overexposure corresponding to 0.6LV. However, instead of such an overexposure, the diaphragm is stopped down by an additional increment corresponding to 0.6LV, so that a proper exposure is achieved. Thus, with this construction of the invention when the total number of pulses provided by the means 1 and corresponding to the light intensity is divided by the particular constant, which in the above example is 5, and there is a remainder, the number of pulses included in this remainder is used to contribute to a determination of the extent of film exposure by way of a compensating adjustment at the diaphragm.

Thus it will be seen that with the structure of the invention the diaphragm and the exposure-time determining structure form a pair of means one of which, namely the diaphragm in the example of FIG. 1, is adjustable and is preliminarily set to remain normally at a given adjusted position during exposure of the film, while the other of this pair of means, namely the exposure-time determining means in the illustrated example, is automatically operable in accordance with the light intensity. The light-responsive means 1 will respond to the light intensity so as to produce in accordance therewith a quantity the magnitude of which corresponds to the light intensity, and the digital memory means 4 has a series of digital positions at least one of which is close to but does not necessarily coincide precisely with the magnitude of this quantity provided by the light-responsive means 1. Thus, the digital memory means 4 is operatively connected with the light-responsive means 1 so as to memorize the magnitude of the quantity provided by the means 1 at least approximately by way of the digital position of the memory means 4 which is close to this magnitude. The shift register 2 forms a detecting means which is operatively connected with the digital memory means 4 in order to detect at least approximately the difference between the magnitude of a quantity which corresponds precisely to the digital position of the memory means 4 and the actual magnitude of the quantity provided by the light-responsive means 1. The several pins 13a–13d and the structure associated therewith form an adjusting means operatively connected with the adjusting means formed by the diaphragm so as to adjust this diaphragm in accordance wih the detected difference, if any, detected by the detecting means, so that in this way at the diaphragm there will be a compensating adjustment, in accordance with the example of FIG. 1, according to this detected difference. It is clear, therefore, that with the invention the compensating structure which compensates the setting of the diaphragm in example of FIG. 1 will provide for the film an exposure which is more accurate than that which would be achieved without the compensating structure of the invention.

Thus, it will be seen that with the above example the shutter or exposure time is memorized by the shift register 4, while, on the other hand, the diaphragm value or setting is finely compensated by way of the digital output of the shift register 2.

Figure 5:
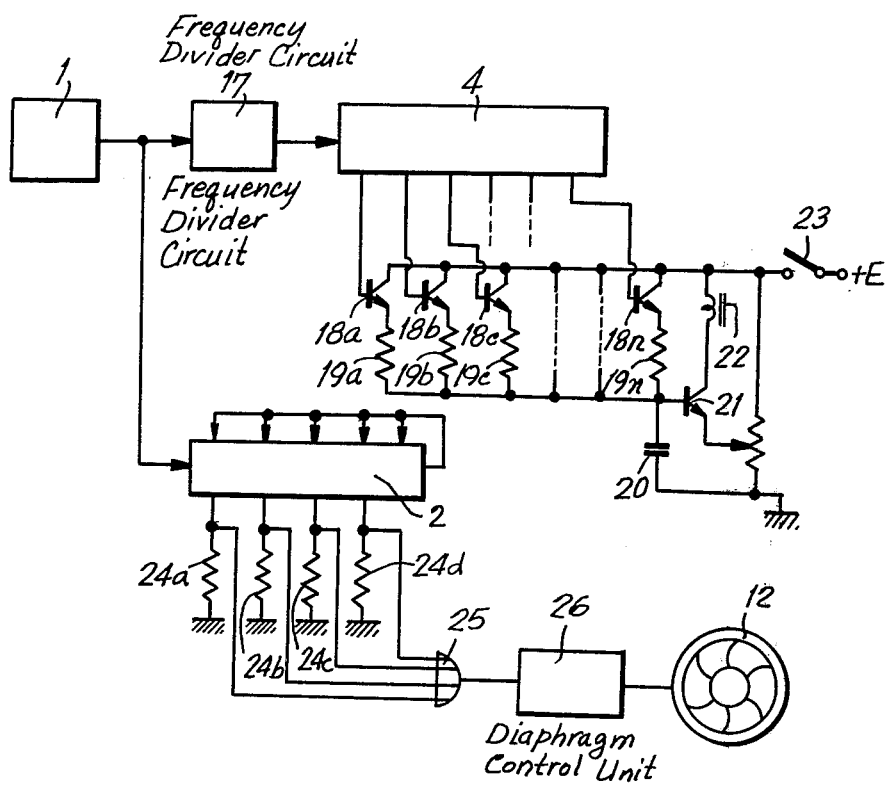
FIG. 5 schematically illustrates an embodiment of the invention according to which the compensation of the diaphragm is achieved by way of a voltage value.

FIG. 5 illustrates an embodiment of the invention which will achieve results similar to the embodiment of FIG. 1. According to the embodiment of FIG. 5 the output of the detecting means formed by the digital memory device 2 is transformed into a voltage which is utilized to provide a compensating adjustment at the diaphragm. According to FIG. 5, a frequency divider circuit 17 is connected between the light-responsive means 1 and the digital memory means 4 so as to transmit to the digital memory means 4 one pulse for each group of pulses of a given number transmitted to the frequency divider circuit means 17 by the means 1. Thus in the above example the frequency divider means 17 will transmit to the digital memory means 4 a single pulse for each 5 pulses generated by the means 1. In the example of FIG. 5 the several stages or positions of the digital memory means 4 are respectively connected to switching transistors 18a–18n, so that a particular one of these transistors is turned "ON" through the output of the shift register 4. Thus, the first pulse received by the means 4 will turn the transistor 18a "ON," the second pulse received by the means 4 will turn the transistor 18b "ON," and so on. These transistors are respectively connected with timing resistors 19a–19n, respectively. A timing capacitor 20 is connected to the several timing resistors in the manner indicated in FIG. 5, and the voltage across this timing capacitor 20 is applied as an input to the switching transistor 21. The output of the transistor 21 has electrically thereto an electromagnet 22 which upon becoming energized by this output will bring about closing of the shutter in the manner described above. A switch 23 is connected into the circuit as illustrated. This switch 23 is automatically closed through a suitable transmission simultaneously with opening of the shutter.

The several stages of the positions of the shift register 2 are respectively connected electrically with resistors 24a–24d which respectively have different resistance values and which are connected between the register 2 and ground. The particular digital output of shift register 2 will select one of these resistors to provide therefrom a given voltage. The voltage which is produced in this way across one of the resistors 24a–24d is applied as an input to the diaphragm control or adjusting means 26 in the form of a suitable meter, servomotor, or the like, this output being transmitted to the adjusting means 26 through an OR gate or circuit 25, so that this means 26 will provide a compensating adjustment of the diaphragm in accordance with the particular voltage value provided through that one of the resistors 24a–24d which corresponds to the position or stage to which the register 2 has been shifted. Thus, the adjusting ring 12 of the embodiment of FIG. 5 can be adjusted to provide a preselected aperture, while through the meter 26 this ring will be automatically turned through a given additional increment as required to provide a compensating adjustment. Thus, the particular output of the shift register 4 will select one of the timing resistors 19a–19n in order to provide an exposure time determined in accordance with the total number of pulses provided from the means 1 divided by the constant which in the particular example is 5. The remainder if any from the latter division will be reflected at the detecting means 2 which will accordingly act through a corresponding one of the resistors 24a–24d to provide through the means 26 a compensating adjustment. Thus the particular one of the resistors 19a–19n selected by the digital memory means 4 together with the capacitor 20 will determine the exposure time while the actual exposure will be compensated, in the event that the register 2 has not been reset in accordance with the number of pulses, less than 5 in the above example, remaining after dividing the total number of pulses from the means 1 by 5.

Figure 6:
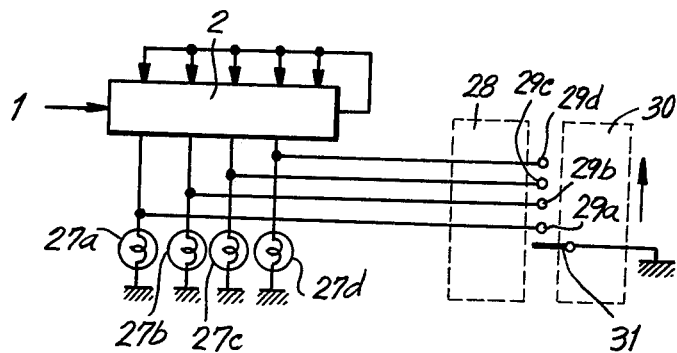
FIG. 6 is a fragmentary schematic illustration of the manner in which an indication can be given to the operator to enable the operator to make in a manual manner the required compensating adjustment.

Thus, in the above examples of FIGS. 1 and 5, the diaphragm setting is compensated either through the digital output of the shift register 2 in the case of FIG. 1 or through a voltage into which this digital output is transformed in the case of FIG. 5. It is also possible, however, simply to use the detecting means 2 in order to indicate to the operator the required compensating adjustment for the diaphragm, and the operator can then manually provide a compensating adjustment of the diaphragm. Such an arrangement is shown in FIG. 6. In FIG. 6 the digital memory means 4 and the remaining structure for determining the exposure time is omitted. In the example of FIG. 6 between the several stages or positions of the shift register 2 and ground there are a plurality of indicator elements 27a–27d which in the illustrated example take the form of lamps which thus are used in the embodiment of FIG. 6 instead of the several resistors 24a–24d, respectively. The terminals 29a–29d of the respective indicating circuits are respectively connected with the diaphragm ring 28 at predetermined spacing with respect to each other therealong, this diaphragm ring 28 being turned by the operator to a position corresponding to the selected aperture. Thus, the several terminals 29a–29d have with respect to each other the same relative positions as the fingers 13a–13d described above in connection with FIG. 1.

The ring 28 of FIG. 6 is used for providing a relatively coarse adjustment of the diaphragm while an additional ring 30 is provided for a fine adjustment of the diaphragm, and the ring 30 is frictionally connected with the ring 28 so as to turn therewith during adjustment of the ring 28. However after the ring 28 is set it is possible for the operator to turn the ring 30 with respect to the ring 28. The ring 30 carries a grounded contact 31 which upon turning of the ring 30 with respect to the ring 28 will move along the several terminals 29a–29d. Thus, selection of the diaphragm setting by turning the ring 28 will cause the fine-adjusting ring 30 to turn with the ring 28 so that the grounded contact 31 will not have its position changed with respect to the terminals 29a–29d. When the total number of pulses provided by the means 1 has been counted, if indeed there is an output at one of the stages of the shift register 2, then a corresponding one of the lamps 27a–27d will be illuminated, and these lamps are situated so as to be visible to the operator. In this event the operator will turn only the ring 30 while the ring 38 will remain stationary, and this turning of the ring 30 will be continued by the operator until the operator notes that the previously illuminated lamp becomes extinguished. The operator will of course stop turning the ring 30 at the instant when the previously illuminated lamp becomes extinguished, and in this way a compensating adjustment can be provided manually with the embodiment of FIG. 6.

However in the embodiment of FIG. 5 the digital output of the detecting means 2 is transformed into a corresponding voltage by way of the D-A converter circuit, in the case of FIG. 7, the compensating voltage is achieved by way of a pulse-accumulating circuit 32. With the particular embodiment of FIG. 7, the constant used to divide into the total number of pulses generated by the light-responsive means 1 is 4, instead of 5 as in the case of the above embodiments. Thus, the light-responsive pulse generating means 1 of FIG. 7 is arranged in such a way that an increase of 1LV in the photographing light intensity will result in generation of 4 pulses. Connected between the digital memory means 4 and the means 1 of FIG. 7 is a frequency divider circuit means 17 which will in this case provide an output of 1 pulse for each 4 pulses received from the means 1, and this 1 pulse provided by the means 17 is transmitted through the OR gate 3 to the digital memory means 4 which operates in the manner described above through the elements 8 and 9 to terminate the exposure after the shutter has been opened so as to start the generation of reference pulses from the means 5. In the case of FIG. 7, the output of the means 1 also has its pulses transmitted to a pulse-accumulating circuit means 32 so that the pulses from the means 1 are transmitted simultaneously both to the accumulating means 32 and to the divider means 17. The pulse-accummulating circuit means 32 operates so as to accumulate the particular number of pulses received thereby into a given voltage value. Each time the number of accumulated pulses at the means 32 reaches a predetermined value, which is to say each time the accumulating means 32 receives a pulse from the frequency dividing means 17, then the pulse-accumulating circuit means 32 is reset to start again the counting of the given number of pulses corresponding to the number of pulses in each group which results in transmission of a single pulse to the memory means 4. Thus the frequency dividing circuit means 17 serves not only to transmit a pulse to the memory means 4 but also to transmit a resetting pulse to the accumulating circuit means 32.

The relationship between these several pulses is graphically illustrated in FIG. 8. Thus one pulse is produced by the frequency dividing circuit means 17 for each four pulses generated by the means 1, while the accumulating means 32 will accumulate the received pulses in the form of a voltage which steps up increasingly until the fourth pulse which resets the accumulating circuit means to provide the stepped voltage variation at the means 32 in a manner shown at the lower part of FIG. 8.

Figure 22:
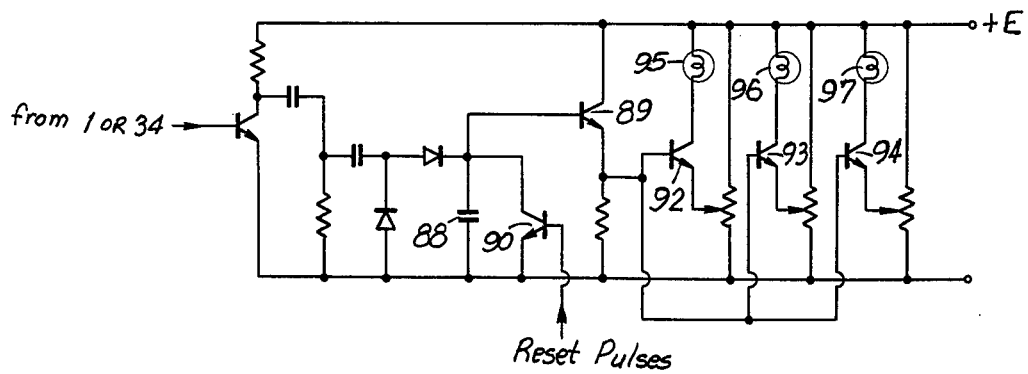

FIGS. 21 and 22 illustrate details of the pulse-accumulating means 32. As is well known, the number of pulses from the generating means 1, or from the generating means 34 referred to below, may be accumulated in a capacitor 88 as a voltage value. In the circuitry of FIG. 21, this accumulated voltage is transmitted to the diaphragm adjusting means 26 (or 37 referred to below) through a transistor 89. A transistor 90 is a switching transistor and becomes turned "ON" upon receiving a reset pulse from the frequency dividing circuit means 17, and upon receiving this pulse the transistor 90 will bring about a discharge of the capacitor 88. An indicating device in the form of a suitable lamp 91, for example, is provided so as to enable the operator to know that there is an intermediate compensating value detected by the detecting means for the purpose of providing a compensating adjustment at the diaphragm. Thus, with an arrangement as shown in FIG. 21, the ouput of the transistor 89 need not be used to operate a meter, servomotor, or the like in order to provide an automatic compensating adjustment. Instead the lamp arrangement may be used in a manner similar to FIG. 6 in order to indicate to the operator the necessity of providing a manual adjustment of the diaphragm to bring about the required compensation, and the required compensating adjustment can be brought about in a manner described above in connection with FIG. 6.

Thus, as is shown in FIG. 22, at the output sides of the switching transistors 92, 93 and 94 of different switching levels there are inserted the lamps 95, 96, 97, respectively, so as to sense the magnitude of the accumulated voltage of the capacitor 88 achieved by way of the transistor 89, and thus the required amount of compensation will be indicated. Of course, instead of using switching transistors and lamps it is possible to use instead a meter at the output side of the transistor 89 to indicate the amount of compensating adjustment which is required.

However, in the case of FIG. 7, the particular output of the pulse-accumulating circuit 32 will provide in accordance with the magnitude of the voltage of this output an operation of the adjusting means 26 so as to provide an automatic adjustment of the diaphragm to achieve the required compensating adjustment.

With this embodiment of FIG. 7 the operator will direct the camera to the object which is to be photographed and after the diaphragm has been set to the desired aperture value the shutter-releasing plunger is depressed. The first part of the movement of this plunger will cause the light-responsive means 1 to generate a number of pulses in accordance with the logarithm of the photographing light intensity, and these pulses are transmitted to the frequency divider circuit 17 as well as to the pulse accumulator 32. Assuming, for example, that the light intensity is 2.75LV, then there will be 11 pulses generated by the means 1, as indicated in FIG. 8. The frequency divider circuit means 17 receives these 11 pulses and produces therefrom two pulses which are transmitted to the digital memory means 4. As is apparent from FIG. 8, the pulse-accumulating means 32 repeats pulse accumulation and resetting through the frequency dividing pulses and thus at the end of the operation provides a voltage $V_A$. Before stopping at this final voltage value $V_A$, the voltage varies continuously within the range $0-V_A$, between each of the pulses provided by the frequency divider 17, and one might conclude that as a result the diaphragm blades will continuously move repeating an opening and closing movement in accordance with this cyclically varying voltage. However, the variation of the accumulating voltage occurs at an extremely high speed, while the mechanical structure of the diaphragm has a considerable inertia, so that in actual practice the diaphragm blades do not move while the accumulating voltage varies.

In the above example, the two pulses from the frequency divider circuit 17 will reset the pulse accumulating circuit 32 twice, and at the same time these two pulses will cause the shift register 4 to shift from one position to the next as a result of the transmission of the pulses from the divider 17 to the memory means 4 through the OR circuit 3. Thus, the means 4 will have a position corresponding to 2LV in this particular example. Therefore, there is an error of 0.75LV, since the actual photographing light intensity is 2.75LV. Thus if exposure of the film were to be determined solely by way of the exposure time provided from the memory means 4, the result would be an overexposure corresponding to 0.75LV. However, since in the above example the pulse accummulating circuit 32 provides a final voltage $V_1$, this later voltage acts through the diaphragm adjusting means 26 to stop the diaphragm down further by an amount corresponding to 0.75LV, and thus a compensating adjustment is provided in this way to avoid the above overexposure which otherwise would result.

Therefore, when the release plunger has been depressed sufficiently to open the shutter, then simultaneously with the opening of the shutter the reference pulse generating means 5 provides the series of reference pulses $P_1$, $P_2$, $P_3$, etc., as shown in FIG. 3, and these pulses are applied as additional shift pulses to the shift register 4 through the OR circuit 3, to continue the shifting toward the last stage which will bring about through SCR 8 energizing of the electromagnet 9 to terminate the exposure as described above. Thus, the exposure time is determined by the duration from opening of the shutter to the instant when the last shift stage of the register 4 has been reached. This exposure time will of course correspond to 2LV, as memorized by the shift register 4 in the above example. Thus, in this example also the memory stages of the structure which determines the exposure time is arranged in such a way that discrete quantities of LV are memorized while intermediate values between these discrete quantities are utilized for compensating adjustment of the diaphragm. Accordingly, even though a relatively small number of memory stages are provided at the memory means 4, nevertheless it is possible to obtain exposure corresponding very closely to the actual light intensity.

Figure 9:
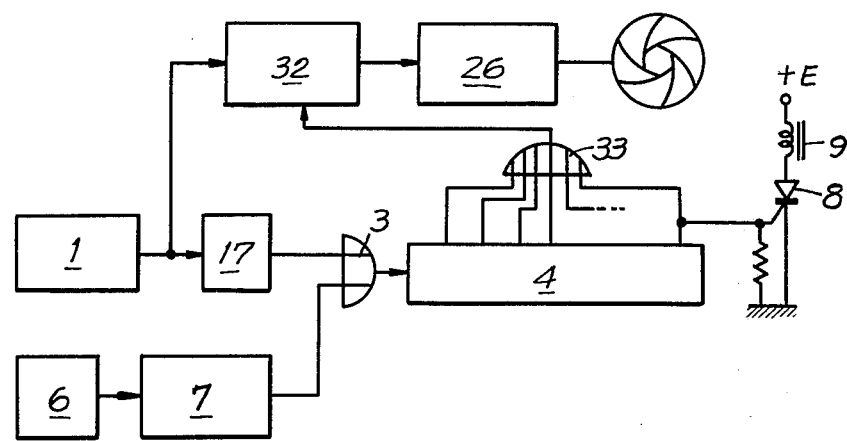
FIG. 9 shows schematically a variation of the embodiment of FIG. 7 according to which the pulse accumulator is controlled from the digital memory means rather than from a frequency divider.

FIG. 9 illustrates an embodiment of the invention which is similar to that of FIG. 7 except that the resetting pulses for the pulse accumulating means 32 are not obtained from the frequency dividing means 17. With the embodiment of FIG. 9, the pulses provided from the frequency divider 17 are transmitter to the digital memory means 4 in the manner described above. However, each time the memory means 4 shifts from one position to the next, a pulse for resetting the pulse accumulator means 32 is transmitted to the latter from the memory means 4 through the OR circuit 33. Thus, the shift pulses which shift the register 4 in FIG. 9 from one position to the next are also utilized as resetting pulses for the pulse-accumulating means 32.

Figure 10:
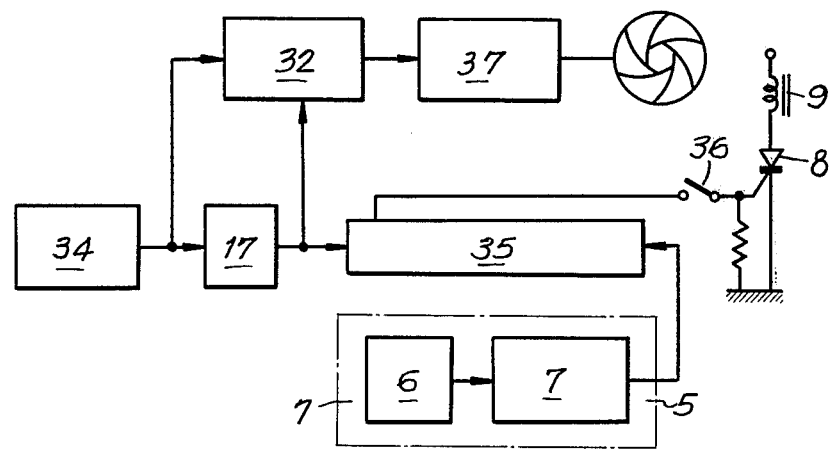
FIG. 10 schematically illustrates an embodiment similar to that of FIG. 7 where a reverse shift register is utilized with a light-responsive means which provides a quantity which is inversely proportional to the light intensity.

FIG. 10 illustrates an embodiment of the invention which is similar to that of FIG. 7 except that in this case the light-responsive means 34 provides a number of pulses inversely proportional to the light intensity. As was mentioned above in connection with FIG. 19, such an arrangement is achieved by interchanging the illustrated positions of elements 80 and 81. In this case the number of light-responsive pulses is also transmitted through a frequency dividing circuit 17 to a shift register which however takes the form of a shift register 35 which is reversible. Thus, the number of pulses which is inversely proportional to the logarithm of the photographic light intensity is transmitted as forward shift pulses to the reversible shift register 35. When the shutter is opened so as to start the operation of the reference pulse generating means 5, the pulses derived from the selector 7 are transmitted to the shift register 35 as reverse shift pulses which return the shift register 35 back to its initial position. Thus, the number of reference pulses which have from one to the next intervals which become gradually greater are transmitted as reverse shift pulses to the reversible shift register 35. The shutter or exposure time in this case is in accordance with the duration required for the reversible shift register to return to its first stage.

The light-responsive pulse-generating means 34 which generates pulses in a number which is inversely proportional to the logarithm of the photographic light intensity is arranged in such a way that a doubling variation of the photographic light intensity 20LV, 19LV, 18LV, etc. produces pulses in a number $e$, $e+m$, $e+2m$, $e+3m$, etc. which constitutes an arithmetic progression. The values of $e$ and $m$ can be arbitrarily determined. For the purpose of explanation it may be assumed that these values are equal to each other and each includes 4 pulses. The reversible shift register 35 receives as forward shift pulses the light-responsive pulses from the lightresponsive means 34 after the frequency dividing operation, and the means 35 also receives as reverse shift pulses the pulses from the reference pulse generating means 5.

In its initial state the reversible shift register 35 has at its first stage an output 1. An SCR 8, similar to those described above, is provided with a gate which is so arranged as to receive the output of the first stage of the reversible shift register 35 through a switch 36. This switch is provided to prevent turning "ON" of the SCR 8 in the initial state of the reversible shift register 35. The switch 36 is closed simultaneously with opening of the shutter through a suitable mechanism provided for this purpose. In this way, the SCR 8 will not be turned "ON" prematurely simply because the first stage of the register 35 has an output prior to opening of the shutter. The switch 36 is not essential since any other suitable means may be provided to prevent turning "ON" of the SCR 8 before opening of the shutter.

In the example of FIG. 10 the voltage derived from the pulse-accumulating means 32 is used to operate a diaphragm adjusting means 37 which is similar to the means 26, the difference being that whereas with the means 26 the diaphragm is automatically stopped down through a certain increment, with the means 37 the diaphragm is further opened through a given increment depending upon the voltage accumulated by the means 32.

With the embodiment of FIG. 10, when the shutter-release plunger is depressed, then during the first part of the movement thereof the light-responsive means 34 will operate to provide a number of pulses inversely proportional to the logarithm of the photographing light intensity, and these pulses are transmitted to the frequency divider circuit 17 as well as simultaneously to the pulse-accumulating means 32. Thus, with this embodiment the number of light-responsive pulses is relatively small when there is a relatively great light intensity while the number of pulses is relatively great when there is a relatively small light intensity. Assuming that the photographing light intensity is 18.25LV, then the number of pulses will be 11 in the above example where the initial light intensity before the starting of the generation of pulses is 20LV, with this light intensity being reduced by 1LV for each increase of four pulses. The frequency divider means 37 will of course receive these 11 pulses and will produce therefrom 2 pulses to be transmitted to the register 35 while the remaining 3 pulses will provide at the pulse-accumulator means 32 a voltage $V_A$ equal to 0.75LV. Thus, the shift register 35 forms a digital memory means which in this case will memorize two pulses and thus will have a position corresponding to a light intensity of 19LV, which would of course produce an error of 0.75LV inasmuch as the actual light intensity is 18.25LV. Therefore, without the compensating adjustment of the invention there would be an underexposure corresponding to 0.75CV. This error, however, is compensated by the adjustment of the diaphragm. Thus the pulse-accumulating means 32 produces the final voltage $V_A$ so that upon receiving this voltage the diaphragm adjusting means 37 further opens the diaphragm by an amount corresponding to 0.75LV.

When the shutter-release button has been depressed so as to open the shutter, the switch 36 of FIG. 10 is simultaneously closed so that it is now possible for the SCR 8 to be turned "ON." The pulse-generating means 5 will provide the reference pulses which will return the shift register 35 to its initial state, and these pulses $P_1$, $P_2$, $P_3$, etc. as shown in FIG. 3 are sent to the shift register 35 as reverse shift pulses causing the register 35 to be shifted by two pulses in the above example in order to provide an output for energizing the electromagnet 9 and terminating the exposure. Thus, the exposure time is determined by that duration required from opening of the shutter to return the shift register 35 back to its first stage. In this particular example the shutter time corresponds to a light intensity of 19LV memorized by the reversible shift register 35. Thus, in this case also the memory stages of the exposure-time determining structure memorize the light intensity as discrete quantities of LV, while with respect to intermediate values between these discrete quantities compensation is made by way of adjustment of the diaphragm. Of course, with the embodiment of FIG. 10 it is also possible to derive the reset pulses for the accumulating means 32 directly from the register 35 rather than from the divider circuit 17.

FIGS. 11-14 relates to embodiments of the invention according to which sawtooth waves are provided with a constant period during a time duration T corresponding to the logarithm of the photographic light intensity. The number of sawtooth waves is memorized by the digital memory means so as to provide the signal for determining the exposure time. On the other hand, any remaining time interval shorter than the period of a sawtooth wave is transformed into a voltage which is used as a compensating signal provided by way of a compensating adjustment of the diaphragm.

Thus, referring to FIG. 11 it will be seen that this embodiment includes a light-responsive timer means 38 which acts as a circuit producing a time duration T which is proportional to the logarithm of the photographic light intensity. A doubling variation 1LV, 2LV, 3LV, etc. of the photographic light intensity causes the time duration T to vary in the manner of an arithmetic progression. This timer means 38 is energized for operation during the initial part of the movement of the shutter-release plunger. In response to operation of the means 38 a pulse oscillator 39 operates to produce output pulses of a constant period only during the time duration T determined by the timer 38. Thus, the number of pulses is directly proportional to the logarithm of the photographic light intensity. A doubling variation of the photographic light intensity 1LV, 2LV, 3LV, etc. corresponds to a variation in the manner of an arithmetic progression of the number of pulses $e$, $e+m$, $e+2m$, etc. As was the case with the above embodiments these values $e$ and $m$ can be arbitrarily determined. For the purposes of illustration it may be assumed that the values e and m are equal to each other and each is equal to 4 pulses.

In the embodiment of FIG. 11 further includes an integrating circuit means 40 for generating the sawtooth waves. This circuit 40 operates during the time duration T provided by way of the light-responsive timer 38. The integrating circuit means 40 returns to its initial state every time it receives a frequency-division light response pulse from the frequency divider circuit means 17. In this way the output voltage of the integrating circuit means 40 is a sawtooth wave of a constant period T as illustrated in FIG. 12. In other words until a reset pulse is received from the frequency divider circuit means 17, the integrating circuit 40 provides a continuously increasing voltage which increases along a straight line as illustrated, and the reset pulse returns this voltage to 0 whereupon this operation is repeated so that the number of sawtooth waves is equal to the number of pulses provided by way of the frequency dividing circuit means 17. The integrating circuit 40 may consist, for example, of a boot strap circuit. FIG. 12 illustrates the relationship between the light-responsive pulses generated by the pulse oscillator 39, the frequency dividing pulses provided by the frequency divider 17, one of these pulses being provided for each four pulses from the oscillator 39, and the sawtooth wave generated by the integrating circuit means 40.

Figure 24:
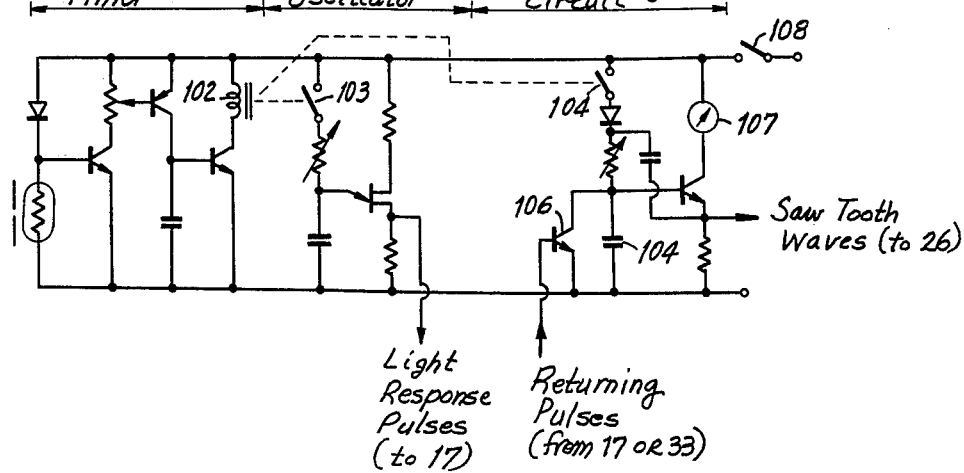

Referring to FIG. 24, it will be seen that the light-responsive timer 38 and the pulse oscillator 39 are of substantially the same construction as the circuitry shown in FIG. 19 for the light-responsive means 1. The arrangement shown in FIG. 24 is such that the electromagnet 102 of the light-responsive timer means 38 causes the switch 103 of the pulse oscillator 39 and the switch 104 of the integrating circuit 40 to become opened. This integrating circuit 40 is of the boot strap type, as pointed out above. At the instant when the switching transistor 106 receives a reset pulse from the frequency divider 37, or from the shift register which is a possible alternative as pointed out above, then the capacitor 105 is discharged, this capacitor 105 being connected in parallel with the switching transistor 106. The discharge of the capacitor 105 results in returning the integration value to its initial state. A meter 107 is provided to enable the operator to know the integration value and is used for manually adjusting the diaphragm in accordance with the indicated value instead of causing the diaphragm to be automatically adjusted by way of the means 26 which is operated from the output of the integrating circuit 40. In addition, the circuitry of FIG. 24 includes a current source switch 108. Thus, with the circuitry of FIG. 24 during the interval determined by the timer circuit, this interval being proportional to the light intensity in the illustrated example, the pulse oscillator will provide pulses transmitted to the frequency divider means 17, and during the same interval the integrating circuit 40 operates to provide the sawtooth waves shown in FIG. 12, with a new wave being initiated each time a reset pulse is provided from the frequency divider 17 as described above.

The switch 108 shown in FIG. 24 is closed during the initial part of the movement of the shutter-tripping plunger, and thus the timer 38 as well as the oscillator 39 and the integrating circuit 40 start to operate before the shutter is opened. After the timer T determined by the timer 38 has elapsed the electromagnet 102 is energized so as to open the switches 103 and 104 and now the pulse oscillation and integrating operation are completed. During this integrating operation each timer the transistor 106 receives a return pulse from the divider 17 or from the shift register this transistor 106 turns "ON" and causes the capacitor 105 to become discharged so that in this way the integrating circuit 40 will provide an output in the form of the sawtooth waves. The time T of the light-responsive timer 38 is proportional to the logarithm of the photographic light intensity. If desired, however, it is possible to provide a time which is inversely proportional to the light intensity simply by interchanging the positions of the cadmium sulfide photosensitive element and the logarithmic compression diode shown at the left of FIG. 24. Such an arrangement for providing a time interval T which is inversely proportional to the light intensity is utilized in the case of FIG. 14 where the timer 41 is such a timer for providing an interval T which is inversely proportional to the light intensity.

Thus, with the embodiment of FIG. 11, depression of the shutter-tripping plunger will cause the timer 38 to operate so that the pulse oscillator 39 and the integrating circuit 40 also operate during the time interval T determined by the timer 38. In this case when there is a relatively great light intensity the time T will be relatively long while at low light the interval T will be relatively short. Assuming that the light intensity is such that it has a value 2.75LV, then as may be seen from FIG. 12 in the above example the oscillator 39 will provide 11 pulses and the frequency dividing circuit 17 will provide two pulses to be transmitted through the gate 3 to the shift register 4 of FIG. 11. The integrating circuit 40 provides two sawtooth waves each of which has a period t and in addition to these two complete waves during the duration T a part of a third wave will be produced until the final voltage $V_A$ of this third partial wave is achieved, corresponding to the light value 2.75LV. Thus it will be seen that this final voltage $V_A$ is a sawtooth wave voltage value corresponding to the time T-2t which is the remainder left over in the interval T after the time interval require for the complete previous sawtooth waves. Thus, by dividing the total interval T by the period t for a single complete sawtooth wave, there will be obtained a given discrete number transmitted to the digital memory means 4, and then the remainder will form the partial wave of the voltage $V_A$ in the illustrated example. It will be seen from FIGS. 12 that the output voltage of the integrating circuit 40 varies continuously in the range between values of 0 and $V_0$ before the final voltage $V_A$ is achieved with the example of FIG. 12. In this case also it is to be noted that the diaphragm blades will not continuously move even though the voltage is continuously varying because the voltage variation is carried out very rapidly while the diaphragm blades have a sufficient inertia to prevent them from following the continuously varying voltage. As a result the diaphragm blades have a compensating adjustment corresponding only to the final voltage $V_A$ remaining after a number of complete sawtooth waves have been provided by way of the integrating circuit means 40.

The two resetting pulses transmitted in the above example to the integrating circuit 40 are also transmitted to the shift register 4 through the OR circuit 3 as shift pulses. These shift pulses shift the register 4 from its first stage towards its last stage. Thus, the shift position of the register 4 is a memory position for the number of input pulses, and in the above example this position corresponds to light intensity of 2LV, so that in the above example there is an error of 0.75LV since the actual intensity is 2.75LV. If exposure were carried out without a compensation for the 0.75LV, there would be a corresponding overexposure. However, in parallel with the memorizing operation carried out by the shift register 4, the integrating circuit 40 has produced the final voltage $V_A$, and this final voltage is used to operate the diaphragm adjusting means 26 which further stops down the diaphragm by an increment corresponding to 0.75LV. Since the shift register 4 has memorized a photographing light intensity of 2LV, the actual exposure time corresponds to a light intensity of 2LV, but of course a compensation for the actual light intensity was made by way of the diaphragm.

Thus, the number of complete sawtooth waves generated during the interval T (2 in the above example) is memorized by the shift register, while the diaphragm aperture is controlled by the remaining fraction of a sawtooth wave voltage (voltage $V_A$ in the above example) corresponding to the remainder time left over after subtracting from T the value Nt where N equals the number of pulses provided by the frequency divider means 17. Thus in this case also even though the digital memory means memorizes the discrete quantities corresponding to the discrete light values, a proper accurate exposure is achieved because of the compensating adjustment of the diaphragm. Thus it will be seen that this embodiment also the number of pulses corresponding to the actual light value is dividied by a constant which in the above example is 4, and the remainder which is left over from this divisison is utilized in the form of a voltage for acting through the adjusting means 26 on the diaphragm. Thus as may be seen from FIG. 12 the remainder of 3 pulses left over after the initial 8 pulses corresponds to the voltage $V_A$.

FIG. 13 shows an embodiment of the invention which is similar to that of FIG. 11 except that in this case the reset pulses for the integrating circuit 40 are derived directly from the shift register 4 each time the latter shifts from one position to the next. These resetting pulses are transmitted from the register 4 to the intergrating circuit 40 through the OR circuit 33.

FIG. 14 shows an example where the timer means 41 responds to the light intensity for providing an interval which is inversely proportional to the logarithm of the photographic light intensity. Thus, in this case the digital memory means takes the form of a reversible shift register 35 which initially receives as forward shift pulses the number of pulses provided by the frequency divider means 17 in response to pulses received from the oscillator 39, the total number of pulses provided by the oscillator 39 being of course inversely proportional to the light intensity. Upon opening of the shutter, the reference pulse generating means 5 will of course generate reference pulses which have from one to the next an increasing interval, and these reference pulses are transmitted to the register 35 as reverse shift pulses, the switch 36 being closed only upon opening of the shutter so that the SCR 8 is not acutated prematurely as pointed out above. The interval T determined by the timer 41 varies as an arithmetic progression as the photographic intensity varies in a doubling manner. Thus, a doubling variation of 20LV, 19LV, 18LV, etc. of the photographic light intensity will produce pulses in a number e, e+m, e+2m, etc., varying in the manner of an arithmetic progression. In this case also the values e and m may be arbitrarily determined. For purposes of explanation it may be assumed that the values e and m are equal to each other with each of these values being equal to 4 pulses.

Therefore, with the embodiment of FIG. 14 when the shutter-tripping plunger is depressed, the first part of the movement thereof will result in energizing the timer 41 so that it will operate during the interval T which is inversely proportional to the logarithm of the light intensity. During this interval the integrating circuit 40 operates. When the time T is relatively short, a relatively great light intensity is provided while the time interval T is long in response to a relatively small light intensity. Assuming that the photographing light intensity is 18.25LV, then 11 light-responsive pulses will be produced. The frequency dividing circuit 17 will produce 2 pulses from these 11 pulses, and the integrating circuit 40 will provide 2 complete sawtooth waves and a final wave portion having a final voltage value $V_A$ as described above. The pulses from the frequency divider circuit 17 are sent to the reversible shift register 35 which thus shifts forwardly by two positions corresponding to the two pulses. Thus, this number of input pulses is memorized as a shift position for determining the exposure time. Therefore, the reversible shift register 35 memorizes the photographic light intensity as 19LV, so that there is an error of 0.75LV inasmuch as the actual light intensity is 18.24LV. However, as mentioned above the final voltage value of the integrating circuit 40 is $V_A$, and receiving this latter voltage the diaphragm adjusting means 37 will automatically adjust the diaphragm by further opening the latter through an increment equal to 0.75LV. Thus, an exposure time corresponding to 19LV is memorized as the photographic light intensity by the reversible shift register 35. Therefore in this example discrete LV quantity memorizing of photographic light intensity is carried out by the memory stages of the exposure-time determining structure while the intermediate partial value adjustment is made by way of the diaphragm controls. Accordingly, even though a relatively small number of memory stages may be included in the shift register 35, it is still possible to achieve a highly accurate exposure by way of the compensation of the diaphragm. It is to be noted that in the case of FIG. 14 also instead of providing the reset pulses for the integrating circuit 40 from the frequency dividing circuit 17 it is possible to derive these reset pulses directly from the shift register 35 through a suitable OR gate 33 as shown in the case of FIG. 13.

FIGS. 15–18 illustrate embodiments of the invention according to which the setting of the diaphragm aperture is adjusted so as to provide a compensation in accordance with the difference between a pair of voltages one of which corresponds to the actual intensity of the photographing light and the other of which corresponds to the position of the digital memory means.

Referring to FIG. 15, this embodiment of the invention includes a photosensitive means for producing a voltage corresponding to the photographing light intensity, this particular photosensitive means being situated at a location where it is capable of receiving light from the object which is to be photographed even after the mirror has swung up, just prior to opening of the shutter.

As is shown in FIG. 15, the light-responsive pulse-generating means 43 includes a photosensitive means 42 in the form of a cadmium sulfide cell or the like positioned at the viewfinder in the path of light which has travelled through the objective and which is reflected by the mirror up to the viewfinder, so that the light-responsive means 43 generates a number of pulses in accordance with the light which has already passed through the diaphragm 67 which is schematically indicted at the upper right portion of FIG. 15. Of course, just prior to opening of the shutter to expose the film the mirror is swung up so that it no longer extends across the optical axis, and at this time the light travelling from the object which is to be photographed to the photosensitive means 42 is necessarily interrupted. The light-responsive means 43 will in this case provide a number of pulses which is directly proportional to the logarithm of the intensity of the photographic light. These pulses are transmitted to a shift register 44 which receives these pulses from the pulse-generating means 43 as shift pulses and memorizes, at a position corresponding to the number of shift pulses, a signal 1 which is the output from a signal generating circuit 45 consisting, for example, of a monostable multivibrator. In this particular example the number of light-responsive pulses varies in such a way that each pulse corresponds to a variation in the photographic light intensity of 1LV, and the shift register 44 is arranged in such a way as to carry out a memorizing of the photographic light intensity in the form of a discrete quantity corresponding to a given LV quantity. Thus, the output signal derived from the signal generating circuit 45 will be located along the shift register 44 at a stage thereof which corresponds to the number of discrete complete pulses from the means 43 which correspond to the particular LV in accordance with the intensity of the light at the object to be photographed.

Simultaneously with the opening of the shutter, a pulse oscillator 46 is set into operation. For example, as was pointed out above, during the initial part of the depression of the shutter-tripping plunger the units 43 and 45 are energized while when the plunger has been depressed sufficiently to trip the shutter, simultaneously the circuit to the pulse oscillator 46 is completed, and this oscillator 46 has an output in the form of pulses of a constant period. The pulse oscillator 46 may consist, for example, of astable multivibrator. Thus, reference pulses will start to be delivered from the pulse oscillator 46 simultaneously with the opening of the shutter. These pulses from the oscillator 46 are received by a frequency divider circuit 47 which is utilized for the purpose of taking into account the factor of film sensitivity, etc., and such a frequency divider circuit 47 may be provided as required. A binary counter 48 receives the pulses which have undergone frequency dividing operation. A plurality of AND circuits 49 respectively interconnect the stages of the binary counter 48 which respectively correspond to the stages of the shift register 44, in the manner illustrated in FIG. 15. These AND circuits 49 compare the outputs of the corresponding positions of the shift register 44 and the binary counter 48. Thus, the shift register 44 shifts from the left toward the right, as viewed in FIG. 15, while the binary counter 48 shifts from the right toward the left. When a particular stage of the binary counter 48 receives a signal which is connected through an AND circuit 49 to that one of the positions of shift register 44 which has the output 1, then this particular AND circuit 49 will provide a signal to the OR gate 50 so as to transmit through the latter a signal to the circuitry which brings about closing of the shutter and termination of the exposure. Thus, when the outputs of the shift register 44 and binary counter 48 coincide with each other a shutter-closing signal will be produced. With this construction of FIG. 15, the shift register 44 carries out discrete LV quantity memorization of the photographic light intensity so that the exposure time has a doubling variation. While in FIG. 15 the shift register 44 and the binary counter 48 each have 6 stages, practically any number of stages may be arbitrarily provide as desired.

A series of resistors 51a–51f are respectively connected between the several bit positions of the shift register 44 and ground. The arrangement is such that a current will flow only through that one of these resistors which corresponds to the position where the signal corresponding to light intensity is memorized. The voltage which is produced across this particular resistor is applied as an input to a transistor 57, referred to below, through an OR circuit 52.

A photosensitive means in the form of a cadmium sulfide cell 53 is situated at the camera at a location where it can continuously receive light from the object to be photographed, even after the mirror has swung up. For example the photosensitive means 53 can be situated so as to receive light through a window at the front wall of the camera. The arrangement is such that the light from the object is transmitted to the photosensitive means 53 through a diaphragm 55 which is connected through a suitable transmission with the ring 54 used for preselecting the setting of the diaphragm 67. A logarithmic compression diode 56 is connected in series with the photosensitive means 53 so that a circuit is in this way provided which produces a voltage corresponding to the actual intensity of the photographic light.

The transistor 57, the base of which is connected to the OR gate 52 so as to receive the output therefrom, varies at its collector-emitter internal resistance in response to its input voltage which is determined by the magnitude of that one of the resistors 51a-51f which is connected with the stage of the shift register 44 which provides the output 1 corresponding to the light intensity. Thus, that one of the resistors 51a–51f which is electrically connected with the bit position of the digital memory means 44 which corresponds to the light intensity provides a voltage which is the input voltage to the base of the transistor 57. A logarithmic compression diode 58 is connected to the transistor 57. Thus, the several resistors 51a–51f, the OR circuit 52, the transistor 57, and the diode 58 form a circuit which will generate a voltage corresponding to the photographic light intensity which is memorized by the shift register 44.

A differential amplifier is connected between the diodes 56 and 58. This differential amplifier includes the transistors 59 and 60 for respectively receiving inputs determined by the voltage $V_a$ across the diode 56 and $V_b$ across the diode 58. This differential voltage between the transistors 59 and 60 is applied as an input to a meter 65 through the transistors 61 and 63 and a variable resistor 64, a variable resistor 62 being connected to the transistor 61 in the manner shown in FIG. 15. The meter 65 is operatively connected with the diaphragm 67 for adjusting the latter. Any means other than such a meter may be utilized as long as such a means is capable of driving the diaphragm 67 in accordance with the differential voltage detected by the detecting means formed by the circuitry shown at the upper part of FIG. 15. The variable resistors 62 and 64 are provided for the purpose of adjusting the angular deflection of the meter 65. The diaphragm 67 consists of a movable blade 67a and a stationary blade 67b, the movable blade being in driving connection with the pointer of the meter 65. In addition, the construction is such that the meter 65 itself is movable in driving connection with the diaphragm adjusting ring 54. Thus when the ring 54 is turned to provide a preselected aperture the entire meter 65 also turns so that the position of the meter 65 with respect to the diaphram does not change due to adjustment provided by way of the ring 54. The diaphragm ring 54 and the diaphragms 67 and 55 are related to each other in such a way that turning of the diaphragm ring 54 causes the diaphragm 55 to be set together with the diaphragm 67 while the meter 65 is turned. When the pointer of the meter 65 is deflected due to detection of a differential voltage, the diaphragm 67 is additionally adjusted to provide a compensation in accordance with the detected differential voltage. A switch 66 is provided in order to supply current to the differential amplifier and the remainder of the circuitry, this switch 66 being operatively connected to the mechanism which responds to swinging up of the mirror so that the switch 66 closes simultaneously with the swinging up of the mirror.

Thus, with the embodiment of FIG. 15 the diaphragm ring 54 is first turned by the operator so as to provide a selected setting of the diaphragm 67. This will cause the diaphragm blade 67a to turn together with the meter 65, so that in this way the diaphragm 67 is set by the operator to provide preselected aperture. At the same time, the diaphragm 55 is adjusted to provide the same aperture as the diaphragm 67. Then the shutter-tripping plunger is depressed. During connected first part of the movement of this plunger, the circuit to the lightresponsive pluse generating means 43 is completed, so that the latter produces a number of pulses proportional to the logarithm of the photographic light intensity which has passed through the diaphragm 67 and is received by the photosensitive means 42. These pulses are applied as an input to the shift register 44, and the signal is memorized at a position of the digital memory means 44 corresponding to the number of pulses. This operation will cause a voltage to be produced across one of the resistors 51a-51f connected to that stage of the shift register 54 at which the signal corresponding to the number of pulses is memorized. This latter voltage is applied as an input to the transistor 57. These memory operations are carried out prior to the last increment of movement of the shuttertripping plunger.

At the last increment of movement of the shutter-tripping plunger, the mirror is swung up, with simultaneous closing of the switch 66, and of course the shutter opens so as to start the exposure. Inasmuch as the photosensitive means 53 receives light directly from the object to be photographed, with this latter light passing through the diaphragm 55, there is produced at this time a voltage $V_a$ across the diode 56. This voltage $V_a$ corresponds to the actual intensity of the photographing light. Moreover, as a result of the action of the transistor 57 which receives the voltage produced by that one of the resistors 51a–51f corresponding to the memorized position of the memory means 44, there is produced a voltage $V_b$ which corresponds to the memorized photographic light intensity, and this latter voltage $V_b$ is provided across the diode 58. If there is an error or differential between the actual photographing light intensity and the memorized photographic light intensity, then $V_a$ will not be equal to $V_b$. As a result, the pointer of the meter 65 will be deflected in accordance with the difference between these voltages, and the diaphragm 67 will be correspondingly adjusted to compensate in this case the difference between the memorized light intensity and the actual light intensity.

Thus, simultaneously with or very shortly after the mirror has swung up, the shutter is opened and the exposure of the film starts. In synchronism with the opening of the shutter pulses from the oscillator 46 are applied as an input to the binary counter 48 through the frequency divider 47. The binary counter 48 receives these pulses and is shifted in a binary manner to the left, as viewed in FIG. 15, until one of the AND gates 49 receives an input both from the register 44 and the counter 48 so as to produce in this way the signal for terminating the exposure by closing the shutter.

The manner in which the above structure of FIG. 15 operates is illustrated graphically in FIG. 16. Thus, assuming that the photographic light intensity is 1LV, then, both of the photosensitive means 42 and 53 will receive this light off intensity 1LV, and both of these photosensitive means will have equal internal resistance values. Of course, the setting of the diaphragm ring 54 provides the same settings of the diaphragms 67 and 55, so that as a result the same of light is received by both of the photosensitive means. If in this particular example 1 light-responsive pulse is produced by the means 43, then the signal is memorized at the extreme left end stage of the memory means 44 in FIG. 15, so that in this case a voltage is produced across the resistor 51a. Thus, the shift register 44 memorizes the photographing light intensity as 1LV, and the exposure time is determined on the basis of this memorized value so that actually in this particular case a compensation of the setting of the diaphragm 67 is not required. If the magnitude of the resistor 51a is such that the voltage $V_b$ is $V_1$, then at this time under the above circumstances the voltage $V_a$ is also $V_1$, and there is no difference detected by the differential amplifier 59, 60, so that the pointer of the meter 65 does not turn and the diaphragm 67 does not require any compensating adjustment.

In the same way, if the photographic light intensity is 2LV, then with the same settings of the diaphragms 55 and 67, the same light will be received by both of the photosensitive means 42 and 53, and, for example, two light-response pulses will be produced so that the second stage of the shaft register 44 will have the output "1", thus energizing the resistor 51b, so that a resistance value is provided in such a way that $V_a = V_b = V_2$.

Assuming, now, however, that the photographic light intensity is 2.5LV. Thus, in this case also only two light-responsive pulses will be produced because the light-responsive pulse generating means 43 will produce only 1 pulse for each light value and cannot respond to a fraction light value. Accordingly, the shift register 44 remains at the position illustrated in FIG. 15, assuming the very same condition as that obtaining when the actual light intensity is 2LV. Thus the resistor 51b is still that one of the resistors which determines the voltage $V_b$ through the transistor 57, this voltage being applied across the diode 58 as described above. Thus, in this case the shift register 44 memorizes the photographing light intensity as 2LV, and the exposure time, which is determined on the basis of this latter memorized value, corresponds of course to 2LV. If no compensation is made then the result would be an overexposure. However, the actual light intensity 2.5LV is received by the photosensitive means 53 and the voltage $V_a$ has a value $V_{2.5}$ which corresponds to the actual light intensity. On the other hand, the voltage $V_b$ is of a value $V_2$, so that in this case there is indeed a differential voltage $V_{0.5}$ which causes the pointer of the meter 65 to be deflected through a corresponding increment with the result that the diaphragm 67 is adjusted in a compensating manner. In this way a proper exposure is achieved.

Thus it is possible to provide a compensation of the exposure by adjusting the diaphragm 67 by determining the resistance values of resistors 51a-51f in a stepwise manner so that the internal resistance of the transistor 57 is equal to the internal resistance of the photosensitive means 53 while receiving light of different intensities. In this particular example, the photosensitive means 53 produces voltages corresponding to the actual light intensity and it situated at a location where the light impinging on the photosensitive means 53 is not interrupted after the mirror swings up so that there is the added advantage that the intensity of the light from the object to be photographed is measured even after the mirror swings up so that any variation in the light which may happen to take place subsequent to swinging up of the mirror can be taken into consideration in the actual exposure.

Figure 17:
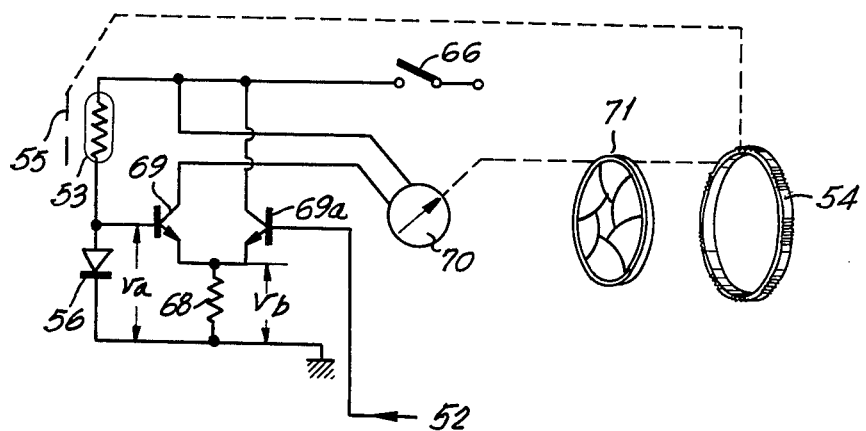
FIG. 17 illustrates a variation of the embodiment of FIG. 15 according to which another type of circuitry is used in connection with the compensating adjustment.

FIG. 17 illustrates another embodiment of the invention for obtaining the difference between the voltage corresponding to the actual photographing light intensity and that corresponding to the memorized light value. The voltage which is the output of the OR circuit 52 is applied in the embodiment of FIG. 17 directly as an input to the transistor 69a of the illustrated differential amplifier, and thus a voltage $V_b$ corresponding to the memorized value is produced across the emitter resistor 68. The base input of the transistor 69 is the voltage $V_a$ corresponding to the actual photographing light intensity, and its emitter potential is determined by the voltage $V_b$ corresponding to the memorized value. The meter 70 of FIG. 17 is connected into the collector circuit of the transistor 69, and it is this meter 70 which operates the diaphragm 71 which is an iris diaphragm and is so arranged that its setting can be determined in accordance with the position to which the ring 54 is turned, with the diaphragm 55 being provided with the same setting. However, the pointer of the meter 70 is connected through a suitable transmission to the diaphragm 71 to provide a compensating adjustment as described above. Thus it is possible to carry out compensation of the diaphragm setting as in the above example of FIG. 15 by making such an arrangement that the voltages $V_a$ and $V_b$ will be equal to each other when the actual photographing light intensity received by the photosensitive means 53 is equal to the memorized photographing light intensity so that in this particular case the pointer of the meter 70 will not be deflected.

Figure 18:
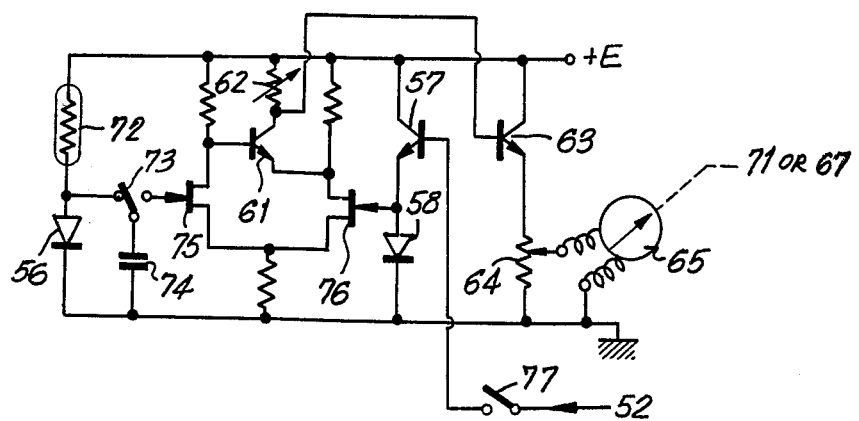
FIG. 18 shows a still further embodiment of a structure of the same general type as that shown in FIG. 15 for providing a compensating adjustment.

FIG. 18 illustrates an example where in a through-the-lens type of light measuring system for achieving an automatic shutter operation to provide an automatic determination of the exposure time, the cadmium sulfide element 72 which forms the photosensitive means to produce a voltage corresponding to the actual light intensity is situated in the path of light travelling to the viewfinder. Thus, the photosensitive means 72 has the same location as the photosensitive means 42 of FIG. 15. Therefore, in the case of FIG. 18 when the mirror swings up the transmission of the light to the photosensitive means 72 is indeed interrupted. However, the voltage corresponding to the actual light intensity is memorized by the capacitor 74. This memorizing action of the capacitor 74 takes place through a changeover switch 73. The circuitry of FIG. 18 includes FET's 75 and 76 which form the differential amplifier and are used instead of the transistors 59 and 60 to provide a high input impedance. The switch 77 of FIG. 18 is closed in response to swinging up of the mirror, in the same way as the switch 66 of FIGS. 15 and 17. It is thus possible with the circuitry of FIG. 18 also to compensate for a difference between the actual light intensity and the memorized light intensity by providing a suitable compensating adjustment of the diaphragm when the photosensitive means for generating the voltage corresponding to the actual photographing light intensity is situated at a location where the light received thereby is interrupted by swinging up of the mirror.

Of course, with the embodiment of FIG. 18 when the mirror swings up the switch 73 changes over from the position shown in FIG. 18 to apply the charge at the capacitor 74 as an input to the FET 75, so that at the latter it is possible to provide a quantity corresponding to the actual light intensity to be compared with the quantity of the FET 76 corresponding to the memorized light intensity as derived from the OR circuit 52. Of course, the pointer of the meter 65 shown in FIG. 18 may be used to adjust either the diaphragm 71 of FIG. 17 or the diaphragm 67 of FIG. 15.

Figure 23:
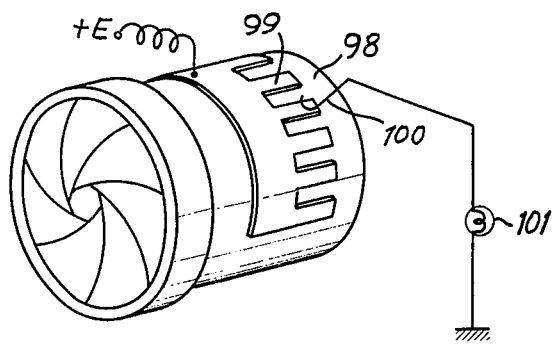
FIG. 23 schematically shows a construction for indicating to the operator when the diaphragm adjustment has been completed.

In connection with embodiments such as those of FIGS. 5 and 10, the diaphragm is automatically adjusted by way of the adjusting units 26 or 37. In order for the operator to know when the compensating adjustment, if any, has been completed with the operation of such units, a construction as shown in FIG. 23 may be provided. Thus, it will be seen from FIG. 23 that the diaphragm ring 98 is provided with a comb-type of contact 99 to which the source voltage is normally supplied as shown schematically in FIG. 23. A fixed contact 100 is so arranged as to be contacted by the teeth of the comb contact 99. Current is supplied through the contact 100 to a lamp 101 whenever the contact 100 engages one of the teeth of the comb-type of contact 99. Thus, while the diaphragm ring 98 is turned the several teeth 99 will be displaced with respect to the contact 100 providing an opening and closing of the circuit which includes the lamp 101 so that the lamp 101 will be repeatedly turned on and off providing a blinking which will indicate to the operator that units such as the diaphragm control units 26 or 37 are operating. when the blinking terminates, the operator will know that the compensating adjustment of the diaphragm has been completed. Of course it is also possible to detect the compensating adjustment of the diaphragm through suitable electromagnet or photoelectric means.

What is claimed is:

1. In a camera, diaphragm means for determining the magnitude of the exposure aperture through which film in the camera is exposed, shutter means for determining the time during which film in the camera is exposed, said diaphragm means and shuter means forming a pair of means for participating in the determination of the extent to which film in the camera is exposed, said pair of means including one means which is adjustable and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresonding precisely to said one digital position of said digital memory means and the actual magnitude of a quantity corresponding more precisely to the light intensity to which said light-responsive means responds, adjusting means operatively connected to said one adjustable means for adjusting the latter in accord with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment.

2. The combination of claim 1 and wherein said other of said pair of means is said shutter means for determining the exposure time.

3. The combination of claim 2 and wherein said one of said pair of means is said diaphragm means for determining the magnitude of the exposure aperture.

4. The combination of claim 1 and wherein said light-responsive means responds to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of said pulses smaller than the number included in each of said groups, and said compensating adjustment of said one means being provided in accordance with the number of pulses included in said remainder.

5. The combination of claim 1 and wherein said detecting means provides one voltage corresponding to the actual light intensity and is operatively connected with said digital memory means for providing a second voltage corresponding to said one digital position of said digital memory means, and said detecting means providing a voltage differential, if any, between the latter voltages, said adjusting means being operatively connected with said one of said pair of means for adjusting the latter in accordance with said voltage differential.

6. The combination of claim 5 and wherein said detecting means includes its own light-responsive means for providing said voltage corresponding to the light intensity.

7. The combination of claim 6 and wherein said one of said pair of means is an adjustable diaphragm for providing an adjustable exposure aperture, the other of said pair of means determining the exposure time, and said light-responsive means of said detecting means including a diaphragm operatively connected with said diaphragm which forms said one of said pair of means to be simultaneously adjusted therewith.

8. In a camera, a pair of means for participating in the determination of the extent to which film in the camera is exposed, said pair of means including one means which is adjustable and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresponding precisely to said one digital position of said digital memory means and the actual magnitude of a quantity corresponding more precisely to the light intensity to which said light-responsive means responds, adjusting means operatively connected to said one adjustable means for adjusting the latter in accordance with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment, said light-responsive means responding to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of said pulses smaller than the number included in each of said groups, and said compensating adjustment of said one means being provided in accordance with the number of pulses included in said remainder, said detecting means being itself in the form of a digital memory means which counts the pulses provided by said light-responsive means and which is automatically reset when the number of the latter pulses is equal to the number included in each of said groups.

9. The combination of claim 8 and wherein said one means is an adjustable diaphragm for determining the exposure aperture while the other of said means determines the exposure time, said detecting means being in the form of a shift register operatively connected with said light-responsive means for counting the pulses produced thereby and for automatically resetting each time the number of said pulses is equal to the number of pulses in each of said groups, said first-mentioned digital memory means itself being in the form of a shift register operatively connected to said detecting means for shifting from one digital position to the next in response to resetting of said shift register of said detecting means, said diaphragm including a rotary diaphragm ring having a projection, a plurality of fingers successively situated in the path of movement of said projection, a plurality of electromagnets operatively connected with said fingers for respectively retracting the latter from said path, and a plurality of OR circuit means electrically connected between said shift register of said detecting means and said electromagnets for energizing the latter according to the number of pulses detected by said detecting means so that when said projection of said diaphragm adjusting ring engages or does not engage said fingers as controlled by said plurality of electromagnets, a compensating adjustment will be made at said diaphragm.

10. The combination of claim 8 and wherein said one means is an adjustable diaphragm while said other means determines exposure time, said detecting means providing a series of voltages the magnitudes of which respectively correspond to the remainder, if any, and diaphragm-adjusting means operatively connected with said diaphragm and with said detecting means for automatically adjusting said diaphragm in accordance with the detected voltage, if any, provided by said detecting means.

11. The combination of claim 8 and wherein said one means is an adjustable diaphragm while said other means determines exposure time, said diaphragm being manually adjustable and said detecting means including a series of lamps one of which becomes illuminated in accordance with the remainder, if any, detected by said detecting means, a series of electrical contacts respectively connected electrically with said lamps, and said diaphragm means having a manually movable adjusting member carrying a contact for moving along said contacts which are respectively connected electrically with said lamps and connected into an electrical circuit for extinguishing any one of said lamps which is illuminated when the diaphragm has been manually adjusted in accordance with the remainder, if any, detected by said detecting means.

12. In a camera, a pair of means for participating in the determination of the extent to which film in the camera is exposed, said pair of means including one means which is adjustable and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresponding precisely to said one digital position of said digital memory means and the actual magnitude of a quantity corresponding more precisely to the light intensity to which said light-responsive means responds, adjusting means operatively connected to said one adjustable means for adjusting the latter in accordance with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment, said light-responsive means responding to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of said pulses smaller than the number included in each of said groups, and said compensating adjustment of said one means being provided in accordance with the number of pulses included in said remainder, a frequency dividing means being connected between said light-responsive means and said digital memory means for transmitting to the latter a single pulse for each of said groups of pulses, said detecting means including a pulse-accumulating means which is connected with said light-responsive means for counting the pulses produced thereby and which is also connected with said frequency dividing means to be reset by each pulse provided by said frequency dividing means, and means connected between said pulse-accumulating means and said one of said pair of means for adjusting the latter in accordance with the pulses, if any, accumulated at said pulse-accumulating means when said digital memory means has said one digital position which is close to said magnitude.

13. The combination of claim 12 and wherein said one of said pair of means is a diaphragm for adjusting the size of the exposure aperture and the other of said pair of means determines the exposure time, said means connected between said pulse-accumulating means and said diaphragm automatically adjusting the latter in accordance with the number of pulses, if any, accumulated by said pulse-accumulating means after said digital memory means has said one digital position close to said magnitude.

14. In a camera, a pair of means for participating in the determination of the extent to which film in the camera is exposed, said pair of means including one means which is adjustable and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresponding precisely to said one digital position of said digital memory means and the actual magnitude of a quantity corresponding more precisely to the light intensity to which said light-responsive means responds, adjusting means operatively connected to said one adjustable means for adjusting the latter in accordance with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment, said light-responsive means responding to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of said pulses smaller than the number included in each of said groups, and said compensating adjustment of said one means being provided in accordance with the number of pulses included in said remainder, a frequency dividing means being connected between said light-responsive means and said digital memory means for transmitting a pulse to the latter only after said frequency dividing means divides the pulses from said light-responsive means into said groups, said detecting means being in the form of a pulseaccumulating means which counts the pulses from said lightresponsive means and said digital memory means being operatively connected to said pulse-accumulating means for resetting the latter each time said digital memory means receives a pulse from said frequency dividing means.

15. In a camera, a pair of means for participating in the determination of the extent to which film in the camera is exposed, said pair of means including one means which is adjustable and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresponding precisely to said one digital position of said digital memory means and the actual magnitude of a quantity corresponding more precisely to the light intensity to which said light-responsive means responds, adjusting means operatively connected to said one adjustable means for adjusting the latter in accordance with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment, said light-responsive means responding to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of said pulses smaller than the number included in each of said groups, and said compensating adjustment of said one means being provided in accordance with the number of pulses included in said remainder, said digital memory means being in the form of a forward shift register, said light-responsive means being operatively connected with said shift register for providing a logarithmically compressed number of pulses in response to the light intensity, and means for providing at the start of the exposure time a series of reference pulses for said shift register to complete the operation thereof until a given position when the exposure time terminates.

16. In a camera, a pair of means for participating in the determination of the extent to which film in the camera is exposed, said pair of means including one means which is adjustable and and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresponding precisely to said one digital position of said digital memory means and the actual magnitude of a quantity corresponding more precisely to the light intensity to which said light-responsive means responds, adjusting means operatively connected to said one adjustable means for adjusting the latter in accordance with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment, said light-responsive means responding to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of pulses smaller than the number included in each of said groups, and said compensating adjustment of said one means being provided in accordance with the number of pulses included in said remainder, said digital memory means being in the form of a reversible shift register while said light-responsive means provides a number of logarithmically compressed pulses inversely proportional to the light intensity to be received by said reversible shift register, and reference pulse means for providing a series of reference pulses for reversing said shift register back to its initial position to determine the exposure time.

17. In a camera, a pair of means for participating in the determination of the extent to which film in the camera is exposed, said pair of means including one means which is adjustable and preliminarily set to remain normally at a given adjusted position during exposure of the film, and the other of said means being automatically operable in accordance with light intensity, light-responsive means for responding to the light intensity and for providing in accordance therewith a quantity the magnitude of which corresponds to the light intensity, digital memory means having a series of digital positions at least one of which is close to but does not necessarily coincide precisely with the magnitude of said quantity, said digital memory means being operatively connected to said light-responsive means for memorizing said magnitude of said quantity at least approximately by way of said one digital position which is close thereto, detecting means operatively connected with said digital memory means for detecting at least approximately the difference between the magnitude of a quantity corresponding precisely to said one digital position of said digital memory means and the actual magnitude of a quantity corresponding more precisely to the light intensity to which said light-responsive means responds, adjusting means operatively connected to said one adjustable means for adjusting the latter in accordance with said difference, if any, detected by said detecting means, so as to provide at said one means a compensating adjustment according to said difference, and said digital memory means being operatively connected with the other of said means for operating the latter according to said one digital position which is close to the magnitude of a quantity corresponding to said light intensity, whereby if the latter magnitude does not coincide precisely with said one digital position the compensating adjustment of said one means will provide for film in the camera an exposure more accurate than that which would be achieved without said compensating adjustment, said light-responsive means responding to the light intensity for providing a plurality of pulses the total number of which corresponds to the light intensity, said digital memory means corresponding at said series of digital positions thereof to equal groups of said pulses, so that said one digital position which is at least close to said magnitude is equal to the total number of said pulses divided by a constant equal to the number of pulses in each of said groups, and said detecting means detecting when there is a remainder left over from dividing said total number of pulses by said constant, said remainder, if any, being equal to a given number of said pulses smaller than the number included in each of said groups, and said compensating adjustment of said one means being provided in accordance with the number of pulses included in said remainder, said light-responsive means including a light-responsive timer for responding to the light intensity for a given period of time corresponding to the light intensity, a pulse oscillator operatively connected with said timer for providing said pulses corresponding to the light intensity, a frequency divider being electrically connected with said pulse oscillator for dividing the number of pulses produced thereby into said groups with said digital memory means receiving from said frequency divider a pulse for each of said groups to determine said one digital position of said digital memory means, said detecting means including an integrating circuit means for providing a series of sawtooth waves each of which has a gradually increasing voltage during the time that said frequency divider receives a number of pulses from said pulse oscillator equal to said group, so that when there is a remainder of said frequency pulses after said one digital position of said digital memory means has been provided, said remainder corresponds to a given voltage of one of said sawtooth waves, and said adjusting means being operatively connected with said integrating circuit means for responding to the latter voltage for providing an automatic adjustment of said one means in accordance with said latter voltage.

18. The combination of claim 17 and wherein said one means is an adjustable diaphragm while said other means determines the exposure time.

* * * * *